(12) United States Patent
Beidaghi et al.

(10) Patent No.: US 10,756,345 B2
(45) Date of Patent: Aug. 25, 2020

(54) ELECTROCHEMICAL SYSTEMS COMPRISING MXENES AND MAX PHASE COMPOSITIONS AND METHODS OF USING THE SAME

(71) Applicant: Auburn University, Auburn, AL (US)

(72) Inventors: Majid Beidaghi, Auburn, AL (US); Armin Vahid Mohammadi, Auburn, AL (US)

(73) Assignee: Auburn University, Auburn, AL (US)

( * ) Notice: Subject to any disclaimer, the term of this patent is extended or adjusted under 35 U.S.C. 154(b) by 45 days.

(21) Appl. No.: 15/958,888

(22) Filed: Apr. 20, 2018

(65) Prior Publication Data

US 2018/0309125 A1    Oct. 25, 2018

Related U.S. Application Data

(60) Provisional application No. 62/487,738, filed on Apr. 20, 2017, provisional application No. 62/487,748, filed on Apr. 20, 2017.

(51) Int. Cl.

| | |
|---|---|
| *H01M 4/58* | (2010.01) |
| *H01M 10/054* | (2010.01) |
| *H01M 10/0569* | (2010.01) |
| *C01B 32/90* | (2017.01) |
| *H01M 4/46* | (2006.01) |

(52) U.S. Cl.
CPC ............... *H01M 4/58* (2013.01); *C01B 32/90* (2017.08); *H01M 4/463* (2013.01); *H01M 10/054* (2013.01); *H01M 10/0569* (2013.01); *C01P 2006/40* (2013.01); *H01M 2300/0031* (2013.01)

(58) Field of Classification Search
None
See application file for complete search history.

(56) References Cited

U.S. PATENT DOCUMENTS

| | | |
|---|---|---|
| 9,193,595 B2 | 11/2015 | Barsoum |
| 9,415,570 B2 | 8/2016 | Barsoum |
| | (Continued) | |

FOREIGN PATENT DOCUMENTS

| | | | | |
|---|---|---|---|---|
| WO | WO-2016049109 A2 * | 3/2016 | ............ | H01L 33/42 |
| WO | 2017011044 A1 | 1/2017 | | |

OTHER PUBLICATIONS

Elia et al., An overview and future perspectives of aluminum batteries, advanced materials, 28, 7564-7579 (Year: 2016).*
(Continued)

*Primary Examiner* — Daniel S Gatewood
(74) *Attorney, Agent, or Firm* — Quarles & Brady LLP

(57) ABSTRACT

Disclosed herein are electrochemical cells comprising electrodes prepared from layered materials comprising a substantially two-dimensional ordered array of cells having an empirical formula of $M_{n+1}X_n$, where M comprises a transition metal selected from the group consisting of a Group IIIB metal, a Group IVB metal, a Group VB metal, a Group VIB metal, and any combination thereof, X is $C_xN_y$, wherein x+y=n, and n is equal to 1, 2, or 3. Also disclosed herein are batteries comprising the electrochemical cells and methods for electrochemically preparing MXene compositions with the use of the electrochemical cells.

18 Claims, 25 Drawing Sheets

(56) References Cited

U.S. PATENT DOCUMENTS

| | | | |
|---|---|---|---|
| 9,416,011 | B2 | 8/2016 | Barsoum |
| 9,837,182 | B2 | 12/2017 | Barsoum |
| 2016/0344035 | A1* | 11/2016 | Zhamu .................. H01M 4/628 |

OTHER PUBLICATIONS

Abood, HMA, et al. "Do all ionic liquids need organic cations? Characterisation of [AlCl 2-n amide]+ AlCl 4-and comparison with imidazolium based systems." Chemical Communications 47.12 (2011): 3523-3525.

Ambroz, F. et al. Trends in Aluminum-Based Intercalation Batteries. Adv. Energy. Mater. 2017, 7, 1602093.

Anasori, B. et al. Two-Dimensional, Ordered, Double Transition Metals Carbides (MXenes). ACS Nano 2015, 9, 9507-9516.

Anasori, B. et al. "2D metal carbides and nitrides (MXenes) for energy storage." Nature Reviews Materials 2.2 (2017):1-17.

Angell, M. et al. "High Coulombic efficiency aluminium-ion battery using an AlCl3-urea ionic liquid analog electrolyte." (2017) PNAS 114(5): 834-839.

Augustyn, V. Tuning the Interlayer of Transition Metal Oxides for Electrochemical Energy Storage. J. Mater. Res. 2017, 32 (01), 2-15.

Byeon, A. et al. Two—Dimensional Titanium Carbide MXene As a Cathode Material for Hybrid Magnesium/Lithium-Ion Batteries. ACS Appl. Mater. Interfaces 2017, 9, 4296-4300.

Chen, C. et al. "Rechargeable aluminum batteries utilizing a chloroaluminate inorganic ionic liquid electrolyte." (2018) Chem. Commun. 54: 4164-4167.

Chen, J. et al. $CO_2$ and Temperature Dual responsive "Smart" MXene Phases. Chem. Commun. 2015, 51, 314-317.

Chiku, M. et al. Amorphous Vanadium Oxide/Carbon Composite Positive Electrode for Rechargeable Aluminum Battery. ACS Appl. Mater. Interfaces 2015, 7, 24385-24389.

Come, J. et al. A Non-Aqueous Asymmetric Cell with a Ti2C-Based Two-Dimensional Negative Electrode. J. Electrochem. Soc. 2012, 159, A1368-A1373.

Dall'Agnese, Y. et al. High Capacitance of Surface-Modified 2D Titanium Carbide in Acidic Electrolyte. Electrochem. Commun. 2014, 48, 118-122.

Dall'Agnese, Y. et al. Two-Dimensional Vanadium Carbide (MXene) as Positive Electrode for Sodium-Ion Capacitors. J. Phys. Chem. Lett. 2015, 6, 2305-2309.

Das, S. K. K. et al. Aluminum-Ion Batteries: Developments and Challenges. J. Mater. Chem. A 2017, 5, 6347-6367.

Elia, G. A. et al. An Overview and Future Perspectives of Aluminum Batteries. Adv. Mater. 2016, 28, 7564-7579.

Fang, Y. et al. An AlCl3 Based Ionic Liquid with a Neutral Substituted Pyridine Ligand for Electrochemical Deposition of Aluminum. Electrochimica Acta 2015, 160, 82-88.

Gao, T. et al. A Rechargeable Al/S Battery with an Ionic-Liquid Electrolyte. Angew. Chem., Int. Ed. 2016, 55, 9898-9901.

Geng, L. et al. Reversible Electrochemical Intercalation of Aluminum in Mo6S8. Chem. Mater. 2015, 27, 4926-4929.

geng, L. et al. Titanium Sulfides as Intercalation-Type Cathode Materials for Rechargeable Aluminum Batteries. Acs Appl. Mater. Interfaces 2017, 9, 21251-21257.

Halim, J, et al. "Synthesis and characterization of 2D molybdenum carbide (MXene)." Advanced Functional Materials 26.18 (2016): 3118-3127.

International Searching Authority, International Search Report and Written Opinion for application PCT/US2018/028646, dated Jun. 29, 2018.

Jayaprakash, N. et al. "The rechargeable aluminum-ion battery." Chemical Communications 47.47 (2011): 12610-12612.

Jiang, T. et al. Studies on the AlCl3/Dimethylsulfone (DMSO2) Electrolytes for the Aluminum Deposition Processes. Surf. Coat. Technol. 2007, 201 (14), 6309-6317.

Jiao, H. et al. A Rechargeable Al-Ion Battery: Al/Molten AlCl3—urea/Graphite. Chem. Commun. 2017, 53 (15), 2331-2334.

Kitada, A. et al. "AlCl3-dissolved Diglyme as Electrolyte for Room-Temperature Aluminum Electrodeposition." (2014) Electrochemistry 82(11): 946-948.

Kitada, A. et al. Electrochemically Active Species in Aluminum Electrodeposition Baths of AlCl3/Glyme Solutions. Electrochimica Acta 2016, 211, 561-567.

Li, Q. et al. Aluminum as Anode for Energy Storage and Conversion: A Review. J. Power Sources 2002, 110, 1-10.

Lin, M.-C., et al. "An ultrafast rechargeable aluminium-ion battery." Nature 520.7547 (2015): 324-328.

Liu, F. et al. Preparation of High-Purity V2C MXene and Electrochemical Properties as Li-Ion Batteries. J. Electrochem. Soc. 2017, 164, A709.

Lukatskaya, M. et al. "Room-Temperature Carbid-Derived Carbon Synthesis by Electrochemical Etching of Max Phases." (2014) Angew. Chem. Int. 53: 4877-4880.

Lukatskaya, M. R. et al. Cation Intercalation and High Volumetric Capacitance of Two-Dimensional Titanium Carbide. Science 2013, 341, 1502-1505.

Mashtalir, O. et al. Intercalation and Delamination of Layered Carbides and Carbonitrides. Nat. Commun. 2013, 4, 1716.

Naguib, M. et al. MXene: A Promising Transition Metal Carbide Anode for Lithium-Ion Batteries. Electrochem. Commun. 2012, 16, 61-64.

Naguib, M. et al. New Two-Dimensional Niobium and Vanadium Carbides as Promising Materials for Li-Ion Batteries. J. Am. Chem. Soc. 2013, 135, 15966-15969.

Naguib, M. et al. Two-Dimensional Transition Metal Carbides. ACS Nano 2012, 6, 1322-1331.

Naguib, M. et al. 25th Anniversary Article: MXenes: A New Family of Two-Dimensional Materials. Adv. Mater. 2014, 26, 992-1005.

Naguib, M. et al. Large-Scale Delamination of Multi-Layers Transition Metal Carbides and Carbonitrides "Mxenes". Dalt. Trans. 2015, 44, 9353-9358.

Osti, N. C. et al. Effect of Metal Ion Intercalation on the Structure of MXene and Water Dynamics on Its Internal Surfaces. ACS Appl. Mater. Interfaces 2016, 8, 8859-8863.

Qingfeng, L. et al. Electrochemical Deposition of Aluminum from NaCl—AlCl3 Melts. J. Electrochem. Soc. 1990, 137 (2), 593-598.

Rakhi, R. B. et al. Effect of Post-Etch Annealing Gas Composition on the Structural and Electrochemical Properties of Ti2CTx MXene Electrodes for Supercapacitor Applications. Chem. Mater. 2015, 150708171730009.

Robelin, C. et al. Thermodynamic Evaluation and Optimization of the (NaCl+KCl+AlCl3) System. J. Chem. Thermodyn. 2004, 36 (8), 683-699.

Shahzad, F. et al. Electromagnetic Interference Shielding with 2D Transition Metal Carbides (MXenes). Science 2016, 353, 1137-1140.

Simon, P. et al. Materials for Electrochemical Capacitors. Nat. Mater. 2008, 7, 845-854.

Smith, E. L. et al. Deep Eutectic Solvents (DESs) and Their Applications. Chem. Rev. 2014, 114 (21), 11060-11082.

Sun, W. et al. "Electrochemical etching of Ti2AlC to Ti2CTx (MXene) in low-concentration hydrochloric acid solution." (2017) Journal of Materials Chemistry A 5: 21663-21668.

Takahashi, S. et al. Technological and Scientific Issues of Room-Temperature Molten Salts. Plasmas Ions 1999, 2, 91-105.

Tsuda, T. et al. "Review—Electrochemical Surface Finishing and Energy Storage Technology with Room-Temperature Haloaluminate Ionic Liquids and Mixtures." (2017) J. Electrochem. Soc. 164(8): H5007-H5017.

Vahidmohammadi, A. et al. "Two-Dimensional Vanadium Carbide as a High-Capacity Cathode Material Rechargeable Aluminum Batteries." (2017) ACS Nano 11: 11135-11144.

Wang, H. et al. "High-Voltage and Noncorrosive Ionic Liquid Electrolyte Used in Rechargeable Aluminum Battery." (2016) ACS Appl. Mater. Interfaces 8: 27444-27448.

Wang, H. et al. "Anion-effects on electrochemical properties of ionic liquid electrolytes for rechargeable aluminum batteries." Journal of Materials Chemistry A 3.45 (2015): 22677-22686.

Wang, S. et al. A Novel Aluminum-Ion Battery: Al/AlCl3-[EMIm]-Cl/Ni3S2@Graphene. Adv. Energy Mater. 2016, 6, 1600137.

(56) References Cited

OTHER PUBLICATIONS

Wang, W. et al. A New Cathode Material for Super-Valent Battery Based on Aluminum Ion Intercalation and Deintercalation. Sci. Rep. 2013, 3, 3383.
Yang, H. et al. "An Aluminum-Sulfur Battery with a Fast Kinetic Response." (2017) Angewandte Chemie 130(7): 1916-1920.
Yu, W., et al. "Solid solution effects in the Ti2Al (CxNy) Max phases: Synthesis, microstructure, electronic structure and transport properties." Acta materialia 80 (2014): 421-434.
Yu, X. et al. "Room-Temperature Aluminum-Sulfur Batteries with a Lithium-Ion-Mediated Ionic Liquid Electrolyte." (2018) Chem. 4(3): 586-598.
Zhang, C. et al. A Sustainable Redox-Flow Battery with an Aluminum-Based, Deep-Eutectic-Solvent Anolyte. Angew. Chem. Int. Ed. 2017, 56 (26), 7454-7459.

\* cited by examiner

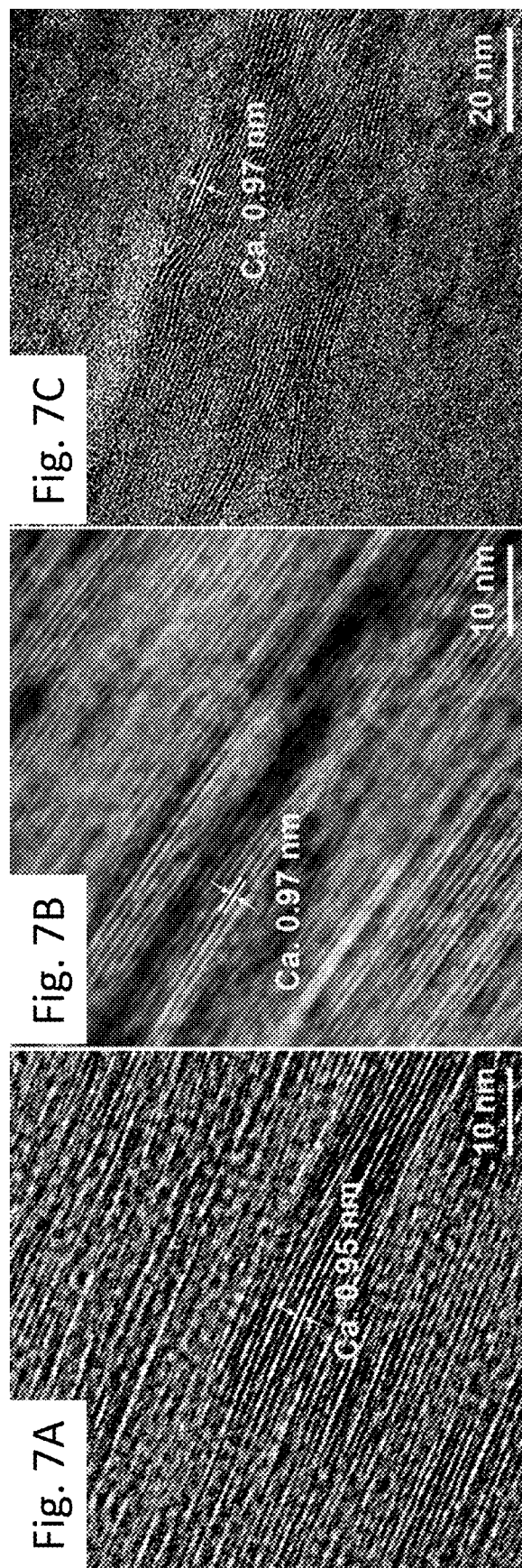

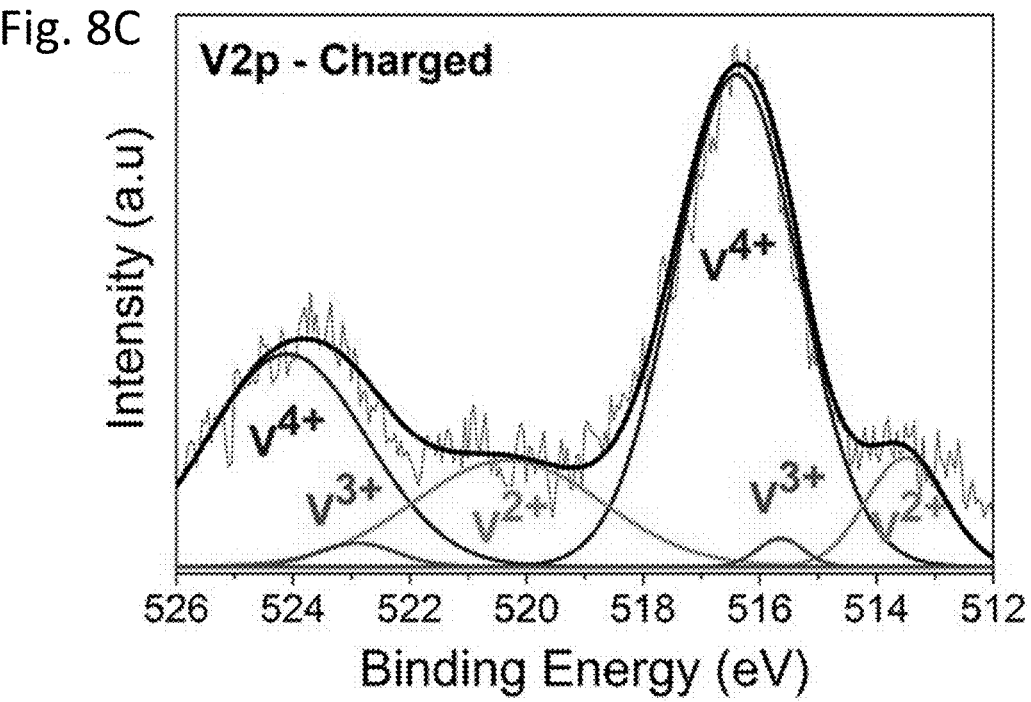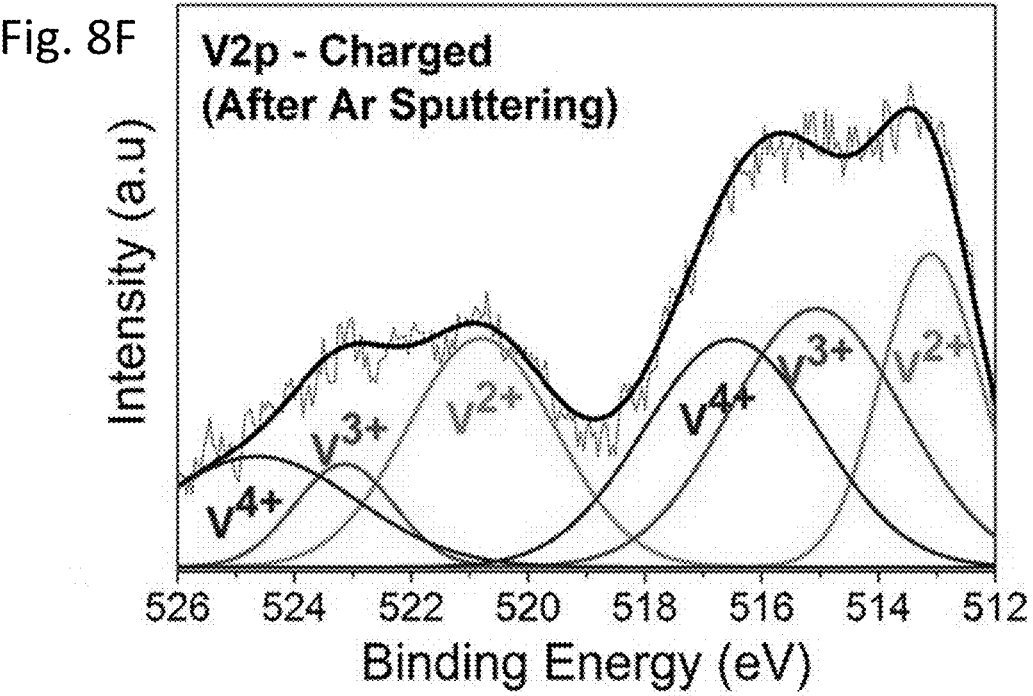

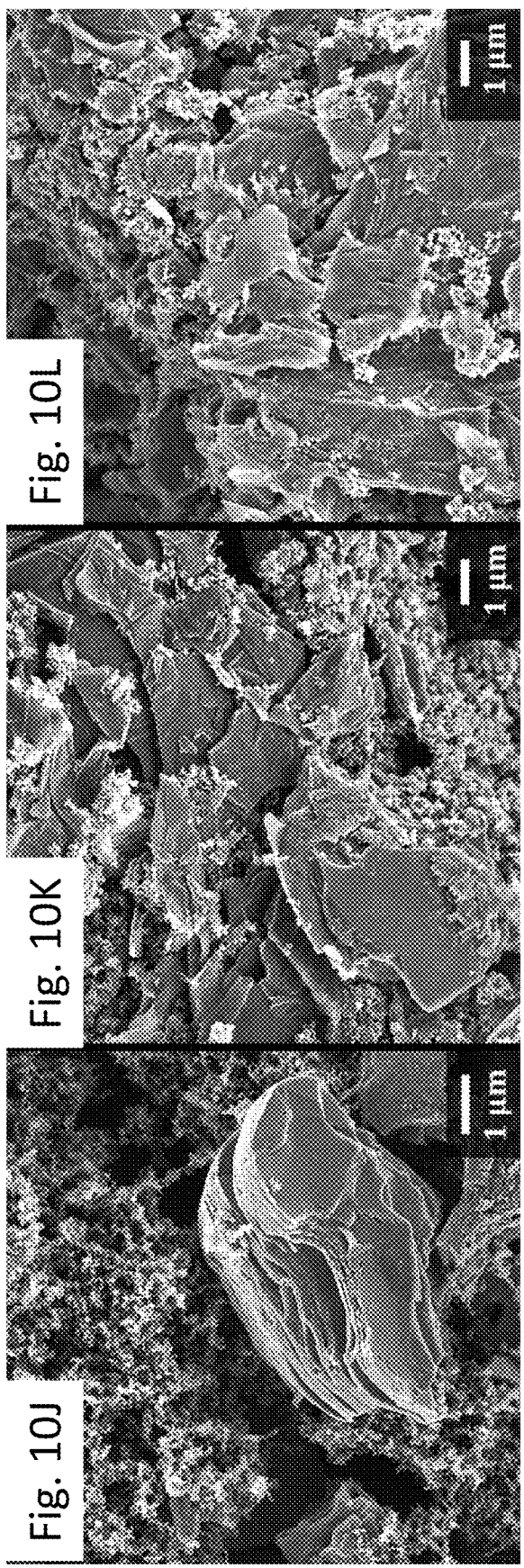

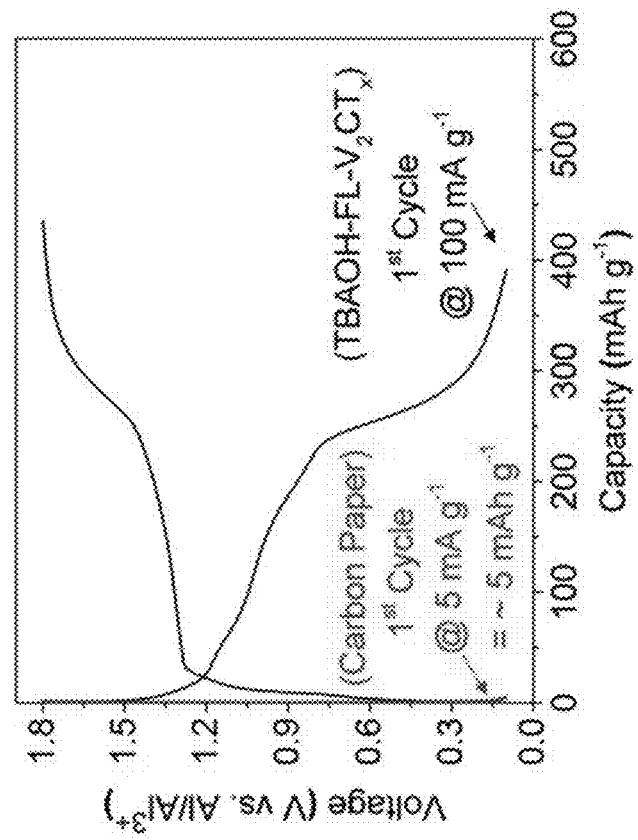
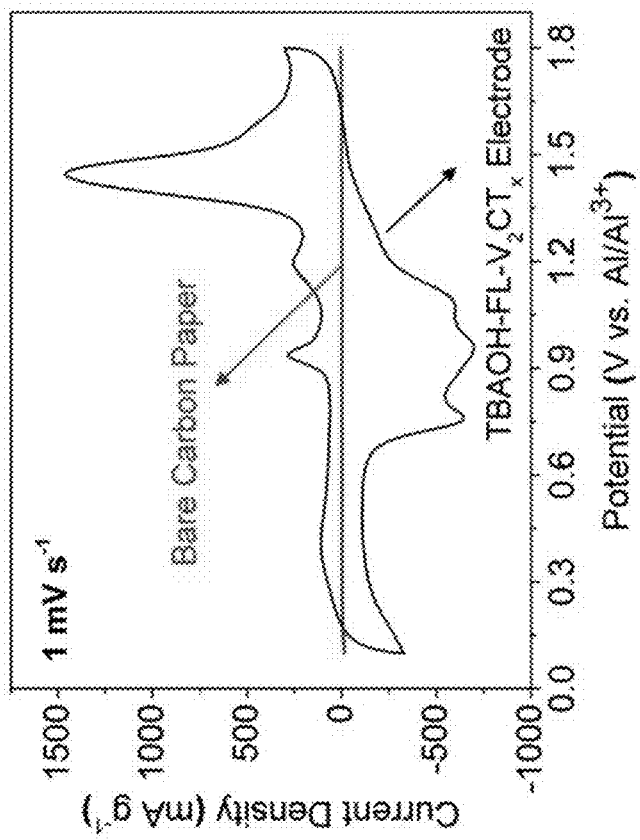
Fig. 12B
Fig. 12A

ELECTROCHEMICAL SYSTEMS COMPRISING MXENES AND MAX PHASE COMPOSITIONS AND METHODS OF USING THE SAME

CROSS-REFERENCE TO RELATED APPLICATIONS

This patent application claims the benefit of priority of United States Provisional Patent Application Nos. 62/487,748, filed Apr. 20, 2017, and 62/487,738, filed Apr. 20, 3017, the contents of each are incorporated herein by reference in its entirety.

FIELD OF INVENTION

The present technology is directed to methods of making and using MXene compositions. More specifically, the present technology is directed to electrochemical methods of making and using MXene compositions.

BACKGROUND

It has been shown that the immersion and treatment of number of Al-based MAX phases with diluted hydrofluoric acid (HF) results in selective removal of Al from the bulk structure and formation of stacked 2D nanosheets of corresponding MX layers that are called MXenes. The aqueous synthesis method of MXenes limits the number of MXenes that can be experimentally synthesized even for removal of Al from some MAX phase structures such as nitride-based MAX phases (i.e., $Ti_2AlN$) or other carbide based MAX phases (i.e. $Cr_2AlC$) where both M and A elements of MXenes are etched. As a result, new methods of preparing MXenes are necessary.

Rechargeable batteries are generally defined as devices which can supply electrical energy and undergo many cycles of charge and discharge to a certain load. In such a system, the electrical energy is stored and produced through transfer of ionic species present in the electrolyte between cathode (positive electrode) and anode (negative electrode). Lithium-ion (Li-ion) batteries that operate based on lithium ions as the active ionic specie have been dominating the market of rechargeable batteries for a long time. However, their safety issues caused by the flammability of the electrolyte and air sensitive materials used in them, high cost of lithium and its limited resources, and the ever-growing demand for energy storage devices has motivated development of other type of rechargeable batteries. Currently, battery systems based on sodium (Na) ions as active ionic species are considered as potential candidate to substitute Li-ion batteries due to lower cost of sodium compared to lithium but they still suffer from similar issues to Li-ion batteries. Other battery systems based on magnesium (Mg) and aluminum (Al) metals are also been investigated but their commercialization is still hindered by lack of proper cathode materials and electrolytes. Particularly, rechargeable aluminum-ion batteries are considered as a promising alternative energy storage devices for Li-ion batteries due to their low cost, abundant resources (aluminum is the most abundant metal in earth crust), low flammability, and three-electron redox reaction leading to high theoretical capacity (theoretical capacity of 2980 mAh/g). As a result, new cathodic materials suitable for using in aluminum batteries are needed.

BRIEF SUMMARY OF THE INVENTION

The present technology is directed to electrochemical systems comprising MXene and MAX phase compositions as well as methods of making and using the same. The electrochemical cells comprise an electrode. The electrode comprises a layered material having a plurality of layers, each of the layers comprising a substantially two-dimensional ordered array of cells having an empirical formula of $M_{n+1}X_n$. M comprises a transition metal selected from the group consisting of a Group IIIB metal, a Group IVB metal, a Group VB metal, a Group VIB metal, and any combination thereof, X comprises $C_xN_y$, wherein x+y=n, and n may be equal to 1, 2, or 3.

In some embodiments, the electrode is a working electrode and the electrochemical cell further comprises a counter electrode and/or a reference electrode. The layered materials in this case may comprise a MAX phase composition having an empirical formula of $M_{n+1}AX_n$ and A comprises an A-group element selected from the group consisting of Al, Si, P, S, Ga, Ge, As, Cd, In, Sn, Tl, Pb, and any combination thereof. Electrochemical cells of this type may be useful in the preparation of MXene compositions by electrochemically etching the A-group element. In certain embodiments, the A-group element may comprise Al and/or the MAX phase composition may comprise a composition having an empirical formula selected from the group consisting of $Ti_2AlC$, $V_2AlC$, $Cr_2AlC$, $Nb_2AlC$, $Ta_2AlC$, $Ti_3AlC_2$, $V_3AlC_2$, $Ta_3AlC_2$, $Ti_4AlC_3$, $V_4AlC_3$, $Nb_4AlC_3$, $Ta_4AlC_3$, $Mo_2TiAlC_2$, $Cr_2TiAlC_2$, $Mo_2Ti_2AlC_3$, and any combination thereof.

In other embodiments, the electrode is a cathode and the electrochemical cell further comprises an anode. The layered materials may comprise a MXene composition having an empirical formula of $M_{n+1}X_n$. Electrochemical cells of this type may be useful in the preparation of batteries, in particular aluminum batteries. In certain embodiments, the MXene composition comprises a composition having an empirical formula selected from the group consisting of $Ti_2C$, $V_2C$, $Cr_2C$, $Nb_2C$, $Ta_2C$, $Ti_3C_2$, $V_3C_2$, $Ta_3C_2$, $Ti_4C_3$, $V_4C_3$, $Nb_4C_3$, $Ta_4C_3$, $Mo_2TiC_2$, $Cr_2TiC_2$, $Mo_2Ti_2C_3$, and any combination thereof, and the MXene composition may be optionally expanded.

Either of the electrochemical cells described above further comprise an electrolyte. In some embodiments, the electrolyte comprises a room-temperature ionic liquid (RTIL). RTILs may comprise $[AlX_4]^-$, $[Al_2X_7]^-$, or any combination thereof where X is independently selected from Cl or Br. The RTIL may also comprise an imidazolium cation, a pyridinium cation, an ammonium cation, a piperidinium cation, a pyrrolidinium cation, an alkali cation, of an any combination thereof. In other embodiments, the electrolyte is a deep eutectic solvent (DES). The DES may comprise $[AlX_4]^-$, $[Al_2X_7]^-$, or any combination thereof where X is independently selected from Cl or Br. The DES may also further comprise a polar molecule, including for example, urea, dimethylsulfone, an amide, a glyme, or a combination thereof.

Another aspect of the invention is batteries comprising an electrochemical cell as described above. The cathodes comprise the layered material as described above and the anode may be suitably matched. In some embodiments, the battery is an aluminum battery and the anode may optionally comprise Al, an Al alloy, a material capable of intercalating Al, or a material capable of alloying with Al. The batteries may also use any of the electrolytes described above. The batteries may also be rechargeable. Another aspect of the invention comprises methods of using the batteries comprising discharging the batteries and, optionally, charging the batteries.

Another aspect of the invention comprises methods for preparing an MXene composition. The methods comprise electrochemically etching a MAX phase composition to remove substantially all of the A-group elements. The method may comprise providing an electrochemical cell as described above, including a working electrode comprising the layered material, a counter electrode, and, optionally, a reference electrode. The method may further comprise applying a potential to the electrochemical cell for an effective amount of time to prepare a MXene composition having an empirical formula of $M_{n+1}A_yX_n$ where y is less than 0.5. In some cases the potential is an anodic potential. The method may employ the use of any of the electrolytes described above.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 1A provides a schematic illustration of an electrochemical cell having a working electrode comprising a MAX phase composition comprising aluminum, a electrolyte comprising chloroaluminates, a Mo counter electrode, and an Al reference electrode. FIG. 1B provides a schematic illustration of the removal of the A-group element from the MAX phase composition to prepare the MXene after potential is applied to the electrochemical cell described in FIG. 1A. FIG. 1C provides a schematic illustration of the deposition of the A-group element onto the counter electrode of the electrochemical cell described in FIG. 1A. (Color labels: aluminum=blue, transition metal=green, $[AlCl_4]^-$=magenta, chloride=cyan, and $[Al_2C_7]^-$=orange)

FIG. 2C shows the XRD patterns from 5 to 50 degrees. FIG. 2D shows the XRD patterns from 5 to 15 degrees.

FIGS. 4B-4C show a (FIG. 4B) SEM image of $V_2AlC$ MAX phase particle and (FIG. 4C) SEM image of $V_2AlC$ treated with 50% HF for 92 h at room temperature.

FIGS. 7A-7C shows HRTEM images of $V_2CT_x$ electrodes; (FIG. 7A) before test, (FIG. 7B) discharged to 0.1 V, and (FIG. 7C) charged to 1.8 V.

FIGS. 8A-8F show XPS spectra of V 2p region of $V_2CT_x$. (FIG. 8A) Original electrode before test. (FIG. 8B) Discharged to 0.1 V vs Al/$Al^{3+}$. (FIG. 8C) Charged to 1.8 V vs Al/$Al^{3+}$, showing the change in the oxidation state of vanadium at each charge/discharge state. XPS spectra of V 2p region for original (FIG. 8D), discharged (FIG. 8E), and charged (FIG. 8F) electrodes after argon etching for 10 min.

FIGS. 10J-10L show SEM images of different $V_2CT_x$ MXene electrode structures: (FIG. 10J) ML-$V_2CT_x$, (FIG. 10K) FL-$V_2CT_x$, and (FIG. 10L) (Interlayer expanded) TBAOH-FL-$V_2CT_x$.

FIG. 12A shows cyclic voltammograms of bare carbon paper used as cathode substrate and $V_2CT_x$ casted on carbon paper, showing the inactivity of the carbon paper in the tested voltage window.

FIG. 12B shows charge-discharge curves in the first cycle for bare carbon paper at 5 mA g$^{-1}$ and TBAOH FL-$V_2CT_x$ at 100 mA g$^1$.

DETAILED DESCRIPTION OF THE INVENTION

Figure 1A:
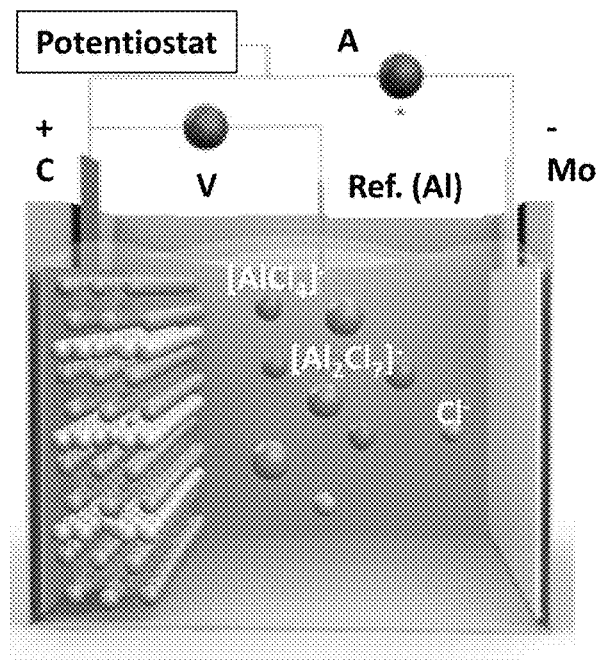
FIGS. 1A-1C provide a schematic illustration of the electrochemical synthesis of MXenes from MAX phases.

Disclosed herein are electrochemical systems comprising MXene and MAX phase compositions. The electrochemical systems described herein are useful for the preparation of MXene compositions by the selective electrochemical etching of A-group elements from MAX phase compositions. Moreover the electrochemical systems described herein are useful to the preparation of rechargeable batteries comprising cathodes made from MXene compositions, including rechargeable aluminum batteries.

MXenes

As used herein, the terms "MXene," "MXene composition," or "MXene material" refer to compositions having one or more layers, each layer comprising a substantially two-dimensional array of crystal cells. The MXene may comprise one transition metal or two transition metals, which may be referred to as a "single transitional metal MXene" or a "double transition metal MXene", respectively).

Single transition metal MXenes comprise one or more layers of a substantially two-dimensional array of crystal cells having an empirical formula of $M_{n+1}X_n$, such that each X is positioned within an octahedral array of M; wherein M is at least one Group IIIB, IVB, VB, or VIB metal; wherein each X is C or N (i.e., stoichiometrically X=$C_xN_y$, including where x+y=1); and n=1, 2, or 3. In some embodiments, these compositions comprise a plurality of layers. Other embodiments provide for stacked assemblies of such layers. Single transition metal MXenes are known art, and described in, for example, U.S. Pat. No. 9,193,595, issued Nov. 25, 2015.

Double transition metal MXenes comprise one or more layers of a substantially two-dimensional array of crystal cells having an empirical formula of M'$_2$M"$X_{n+1}$, such that each X is positioned within an octahedral array of M' and M"; wherein M' and M" each comprise different Group IIIB, IVB, VB, or VIB metals; wherein each X is C or N (i.e., stoichiometrically X=$C_xN_y$, including where x+y=n+1); and n=1 or 2. In some embodiments, these compositions comprise a plurality of layers. Other embodiments provide for stacked assemblies of such layers. Double transition metal MXenes are known art, and described in, for example, International Patent Pub. No. WO 2017/011044, published Jan. 19, 2017.

Additionally, the terms "MXene," "MXene compositions," or "MXene materials" also refer to those compositions derived from MAX phase materials, whether these compositions are present as free-standing 2-dimensional or stacked assemblies.

Analogous to other so-called two-dimensional, atomically-scaled layered solid materials, such as graphene or hexagonal BN, these MXene crystalline compositions may be free-standing or be present in stacked compositions. As used herein, the term "free standing" refers to individual layers wherein the adjacent composite crystal layers are not bonded to one another by covalent bonds or connected by metal-lattice bonds, but may be joined by intervening hydrogen (or even weaker) bonding, such that each such layer can be physically manipulated. However, this term does not preclude the deposition of these layers or stacked layers on substrates or within a polymer, a binder, a glass, or other matrix compositions.

The term "comprising a substantially two-dimensional array of cells" refers to a characteristic of MXene materials. The two-dimensional array of crystal cells may be viewed as an array of cells extending in an x-y plane, with the z-axis defining the thickness of the composition. It is preferred that the z-dimension is defined by the dimension of approximately one crystal cell, but it should be appreciated that real compositions may contain portions having more than single crystal cell thicknesses. The top and bottom surfaces extending in the x-y play of the array are available for chemical modification.

In certain embodiments, the compositions may contain C or N atoms, or a mixture thereof, but in any case, these atoms are positioned within an octahedral or pseudo-octahedral array of M atoms, reminiscent of the positioning of the carbon or nitrogen atom within MAX-phase materials.

As described herein, M, M', and M" refer to one or more members of the Groups IIIB, IVB, VB, or VIB or (aka) Groups 3-6 of the periodic table, either alone or in combination, said members including Sc, Y, Lu, Ti, Zr, Hf, V, Nb, Ta, Cr, Mo, and W.

Single transitional metal MXenes having the empirical formula $M_{n+1}X_n$, wherein X is C, N, or a combination thereof, and n=1, 2, or 3 gives rise to a number of possible compositions. Exemplary compositions when n=1 include, without limitation, those wherein the empirical formula of the crystalline phase is $Sc_2C$, $Sc_2N$, $Ti_2C$, $Ti_2N$, $Mo_2C$, $V_2C$, $V_2N$, $Cr_2C$, $Cr_2N$, $Zr_2C$, $Zr_2N$, $Nb_2C$, $Nb_2N$, $Hf_2C$, and $Hf_2N$. Exemplary compositions when n=2 include, without limitation, those wherein the empirical formula of the crystalline phase is $Ti_3C_2$, $Ti_3N_2$, $V_3C_2$, $V_3C_2$, $Ta_3C_2$, and $Ta_3N_2$. Exemplary compositions when n=3 include, without limitation, those wherein the empirical formula is $Ti_4C_3$, $Ti_4N_3$, $V_4C_3$, $V_4N_3$, $Ta_4C_3$ and $Ta_4N_3$.

Double transition metal MXenes having the empirical formula M'$_2$M"$X_{n+1}$ wherein X is X, N, or a combination thereof, and n=1 or 2 gives rise to a number of possible compositions. Exemplary compositions when n=1 include, without limitation, those wherein the empirical formula of the crystalline phase is $Mo_2TiC_2$, $Mo_2VC_2$, $Mo_2TaC_2$, $Mo_2NbC_2$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$. Exemplary compositions when n=2 include, without limitation, those wherein the empirical formula of the crystalline phase is $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$.

MXene surfaces, in many cases, are not M-terminated (e.g., Ti-terminated), but primarily covered by chemical species or moieties depending on the method of preparation.

For example, chemical groups may be present the MXene is prepared from chemical etching with acidic HF solution. For example in the case of a MXene of nominal composition $Ti_3C_2$ (e.g., derived from MAX phase $Ti_3AlC_2$) in fact is probably better represented by a formula such as $Ti_3C_2(OH)_xO_yF_z$. However, since the exact surface composition may not be known with certainty and can vary from sample to sample, and for the sake of brevity, herein, such MXene compositions of this sort (e.g., such as derived from $Ti_3AlC_2$) may be referred to as $Ti_3C_2(OH)_xO_yF_z$, $Ti_3C_2$, or $Ti_3C_2T_x$ (where $T_x$ refers to "surface terminations"), or more generally $M_{n+1}X_nT_x$, the latter terms being useful to replace the more cumbersome former term, in a manner similar to the use of a general name "graphene oxide" for oxidized graphene, which has a variety of oxygen-containing groups.

In various embodiments, the composition's layer are capable of being physically or chemically modified. Advantageously, the methods of preparation resulting in a MXene comprising a substantially metal-terminated surface allow for the controlled functionalization of the MXene.

For example, in certain embodiments, at least one of the surfaces are coated with a coating comprising H, N, O, or S atoms, for example, a hydride, oxide, sub-oxide, nitride, sub-nitride, sulfide, sub-sulfide. In preferred embodiments, the coating comprises a hydrated or anhydrous oxide, a sub-oxide, or some combination thereof. As used herein the terms "sub-oxide," "sub-nitride," or "sub-sulfide" is intended to connote a composition containing an amount reflecting a sub-stoichiometric or a mixed oxidation state of the transition metal at the surface of oxide, nitride, or sulfide, respectively. Accordingly, the surfaces of the present invention may also contain oxides, nitrides, or sulfides in similar sub-stoichiometric or mixed oxidation state amounts.

In other embodiments, at least one surface is coated with a coating having a pendant moiety which is linked to the surface by an N, O, or S atom (e.g., an M—N, M—O, or M—S bond, respectively). Such surface coatings then may comprise at least one hydroxide, alkoxide, carboxylate, amine, amide, or thiol. These pendants may contain organic moieties, including saturated, unsaturated, and/or aromatic moieties. These organic moieties may optionally include heteroatoms, be linear or branched, and/or may contain one or more functional groups, for example amines and derivatives therefrom, (thio)carboxylic acids and derivatives therefrom, hydroxy or ether groups, and/or thiol groups. The moieties and/or optionally available functional groups may exist in their neutral or ionized state.

Additional embodiments provide for stacked assemblies of at least two layers wherein each layer comprises a substantially two-dimensional array of crystal cells. The number of layers forming the stacked assemblies is not necessarily limited to any particular value, but the stacked assembly comprises between 2 to about 50 layers in some embodiments. In certain embodiments, the assembly has a lower range of at least 2 layers, 3 layers, 4 layers, 5 layers, 10 layers, 15 layers, or 20 layers and an upper range of not more than 50 layers, 45 layers, 40 layers, 35 layers, 30 layers, 25 layers, 20 layers, 15 layers, or 10 layers, including, without limitation, any range between a lower range and an upper range.

In various embodiments, the composite layers characterized as having an average surface area. The average surface area of the stacked assemblies is not necessarily limited to any particular value, but the average surface area may be between about 100 $nm^2$ to about 1 $mm^2$ (i.e., $10^{12}$ $nm^2$). In certain embodiments, the average surface area has a lower range of at least 100 $nm^2$, 1000 $nm^2$, 10,000 $nm^2$, 100,000 $nm^2$, 1 $\mu m^2$, 10 $\mu m^2$, 100 $\mu m^2$, 1000 $\mu m$, or 10,000 $\mu m^2$ and a upper range of not more than 1 $mm^2$, 100,000 $\mu m^2$, 10,000 $\mu m^2$, 1000 $\mu m^2$, 10 $\mu m^2$, or 1 $\mu m^2$, including, without limitation, any range between a lower range and an upper range.

While the surface of these composite layer may be of any shape, it is convenient to describe such shapes as having a major and minor planar dimension (or x-axis and y-axis dimensions, using the envisioned x-y plane as described above). For example, if a quadrilateral or pseudo-quadrilateral shape, the major and minor dimension is the length and width dimensions. In preferred embodiments, the ratio of the lengths of the major and minor axes is in the range of about 1 to about 10 (1:10) to about 10 to about 1 (10:1), about 1 to about 5 (1:5) to about 5 to about 1 (5:1), more preferably about 1 to about 3 (1:3) to about 3 to about 1 (3:1), or about 1 to about 2 (1:2) to about 2 to about 1 (2:1).

The stacked assembly may be characterized by an average interlayer distance between crystal layers. The average interlayer distance by be in the range of about 0.2 nm to about 2 nm. In certain embodiments, the average interlayer distance has a lower range of at least 0.2 nm, 0.3 nm, 0.4 nm, or 0.5 nm and an upper range of 2.0 nm, 1.5 nm, 1.0 nm, 0.9 nm, 0.8 nm, 0.7 nm, or 0.6 nm, including, without limitation, any range between a lower range and an upper range. When prepared by the methods described herein that remove the labile A-phase elements from MAX phase materials, these interlayer distances may be consistent with the atomic radii of the removed elements. For example, the atomic diameter of Al is about 0.25 nm and that of Sn about 0.3 nm.

The stacked assemblies may be capable of intercalating atoms, ions, and/or molecules between at least some of the layers. In some embodiments, the intercalating atoms and/or ions are metal or metalloid atoms or ions. Exemplary atoms or ions include, without limitation, Group IA alkali atoms or ions (e.g., Li, Na, K, Rb, and/or Cs); Group IIA alkaline earth atoms or ions (e.g, Be, Mg, and/or Ca); Groups IIIB, IVB, VB, VIB, VIIB, VIII, IV, or IIB atoms or ions; or Groups IIIA, IVA, VA, or VIA metalloid atoms or ions (e.g., Al, Si, P, S, Ga, Ge, As, Cd, In, Sn, Tl, and/or Pb). In some embodiments, the intercalating ions or molecules include organic bases such as ammonium, n-butylamin, choline hydroxide, and/or tetrabutylammonium hydroxide (TBAOH). In some embodiments, these atoms and/or ions are able to move into and out of the stacked assemblies.

In some cases, the average interlayer distance may also be expanded by intercalating various molecules or ions between the layers. Molecules or ions useful for expanding the interlayer distance include larger organic bases such as tetrabutylammonium hydroxide (TBAOH), choline hydroxide, or n-butylamine. MXenes that have been expanded by intercalating molecules or ions between the layers are referred to as "expanded MXenes."

Additionally, the ability to intercalate aluminum atoms and/or ions, together with the electrical properties of the MXene layers described above, provides the opportunities that these stacked assemblies may be used as energy storing devices (e.g., cathodes) comprising these intercalated stacked composition, or the energy storage devices themselves, for example, batteries, comprising these elements.

MAX Phase Compositions

MAX phase compositions are generally recognized as comprising layered, hexagonal carbides and nitrides As used herein, a "MAX-phase" composition comprises a composition having an empirical formula of $M_{n+1}AX_n$ or $M'_2M''_nAX_{n+1}$. The MAX-phase compositions having an empirical formula of $M_{1+1}AX_n$ or $M'_2M''_mAX_{n+1}$ allow for the preparation of MXene $M_{n+1}X_n$ or $M'_2M''_nX_{n+1}$, respectively. A is referred to as an "A-group element." A-group elements include, without limitation, Al, Si, P, S, Ga, Ge, As, Cd, In, Sn, Tl, Pb, or any combination thereof. As described above for MXene materials, M, M', and M" are transition metals, X is C or N, or a combination thereof, and n may be 1 or 2 or 1, 2, or 3 depending on the MXene to be formed.

Exemplary $M_{n+1}AX_n$ MAX phase compositions when n=1 include, without limitation: $Ti_2CdC$, $Sc_2InC$, $Sc_2AlC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2AlN$, $V_2GaN$, $Cr_2GaN$, $Ti_2GeC$, $Ti_2SnC$, $Ti_2PbC$, $V_2GeC$, $Cr_2AlC$, $Cr_2AlN$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, or $Hf_2SC$. Exemplary $M_{n+1}AX_n$ MAX phase compositions when n=2 include, without limitation: $Ti_3AlC_2$, $V_3AlC_2$, $Ti_3SiC_2$, $Ti_3GeC_2$, $Ti_3SnC_2$, and $Ta_3AlC_2$. Exemplary $M_{n+1}AX_n$ MAX phase compositions when n=3 include, without limitation: $Ti_4AlN_3$, $V_4AlC_3$, $Ti_4GaC_3$, $Ti_4SiC_3$, $Ti_4GeC_3$, $Nb_4AlC_3$, and $Ta_4AlC_3$.

Exemplary $M'_2M''_nAX_{n+1}$ MAX phase compositions when n=1 include, without limitation: $Mo_2TiAlC_2$, $Mo_2VAlC_2$, $Mo_2TaAlC_2$, $Mo_2NbAlC_2$, $Cr_2TiAlC_2$, $Cr_2VAlC_2$, $Cr_2TaAlC_2$, $Cr_2NbAlC_2$, $Ti_2NbAlC_2$, $Ti_2TaAlC_2$, $V_2TaAlC_2$, or $V_2TiAlC_2$. Exemplary $M'_2M''_nAX_{n+1}$ MAX phase compositions when n=2 include, without limitation: $Mo_2Ta_2AlC_3$, $Cr_2Ti_2AlC_3$, $Cr_2V_2AlC_3$, $Cr_2Nb_2AlC_3$, $Cr_2Ta_2AlC_3$, $Nb_2Ta_2AlC_3$, $Ti_2Nb_2AlC_3$, $Ti_2Ta_2AlC_3$, $V_2Ta_2AlC_3$, $V_2Nb_2AlC_3$, or $V_2Ti_2AlC_3$.

Methods for Preparing MXenes

MXenes are produced by selective removal of A-group layer elements from MAX phases. MAX phases have the general formula of $M_{n+1}AX_n$ (n=1,2, or 3) as described above. Previously it has been shown that the immersion and treatment of a number of Al-based MAX phases with diluted hydrofluoric acid (HF) results in selective removal of Al from the bulk structure and formation of stacked 2D nanosheets of corresponding MX layers that are called MXenes. Since etching of the aluminum from MAX phase structure is carried out in diluted acidic aqueous solutions, the surface of the produced two-dimensional MXenes are functionalized with different oxygen, hydroxyl, and fluorine functional groups. Synthesis of bare-MXenes (i.e. no functional groups on the surface) has yet to be reported. In addition, the aqueous etching method for MXene synthesis is limited to Al-based MAX phases.

The aqueous synthesis method of MXenes limits the number of MXenes that can be experimentally synthesized. Even for removal of Al from some MAX phase structures such as nitride-based MAX phases (i.e., $Ti_2AlN$) or other carbide based MAX phases (i.e. $Cr_2AlC$) where both M and A elements of MXenes are etched. This electrochemical synthesis method has unique advantageous over conventional aqueous etching of MAX phases. For instance, through controlled potential limited voltammetry techniques and utilization of electrochemical driven etching it enables removal of A-layer from MAX phases such as $Cr_2AlC$ that their transition metal is more sensitive to harsh acidic environments. Besides, controlled atmosphere and absence of water in the ionic liquid or urea based electrolytes used in the electrochemical system results in 2D MXenes with new surface chemistries that compromise non-hydroxyl or fluorine surface functional groups and can potentially result in new properties of MXenes. Moreover, this method opens a new direction in synthesis of 2D transition metal carbides and/or nitrides and can potentially result in synthesis of many predicted MXene structures that until now their experimental proof has been hindered by limited aqueous based acidic environments used for etching purposes.

Herein we describe electrochemical etching of A-layer elements from MAX phases using room temperature electrolytes. This new synthesis method of 2D MXenes utilizes electrochemical driven etching targetin only A-group layers of MAX phases. The method comprises removing substantially all of the A-group elements from a MAX-phase composition.

As used herein, the term "removing substantially all of the A-group elements" includes embodiments wherein at least 50 atomic % of the A-group elements are removed from a finally recovered sample, relative to the original MAX phase composition. In particular embodiments least 60 atomic %, at least 70 atomic %, at least 75 atomic %, at least 80 atomic %, at least 85 atomic %, at least 90 atomic %, at least 91 atomic %, at least 92 atomic %, at least 93 atomic %, at least 94 atomic %, at least 95 atomic %, at least 96 atomic %, at least 97 atomic %, at least 98 atomic %, or at least 99 atomic % of the A-group elements are removed from a finally recovered sample, relative to the original MAX phase composition.

Removal of the A-group elements is accomplished via electrochemical etching. The method comprises providing an electrochemical cell wherein one of the electrodes comprises a MAX phase composition. The electrochemical cell also comprises an electrolyte for suitable for the selective removal of the A-group elements. The electrochemical cell comprises a counter electrode and, optionally, a reference electrode. By applying a potential across the electrode and counter electrode for an effective amount of time, substantially of the A-group elements.

An "effective amount of time" is the time needed at the applied potential to remove least 50 atomic % of the A-group elements to prepare an MXene composition having an empirical formula of $M_{1n+1}A_yX_n$ where y is less than 0.50. In some cases, y is less than 0.40, 0.30, 0.25, 0.20, 0.15, 0.10, 0.09, 0.08, 0.07, 0.06, 0.05, 0.04, 0.03, 0.02, or 0.01. In some cases, the potential is applied for more than 1 hour, 2 hours, 3, hours, 4 hours, 5 hours, 10 hours, 15, hours, 20 hours, or more than 20 hours. In some cases, the potential is applied for less than 50 hours, 40 hour, 30 hour, or less than 25 hours. In certain cases, the potential is applied for between 1 hour, 2 hours, 3, hours, 4 hours, 5 hours, 10 hours, 15, hours, 20 hours, or more than 20 hours and less than 50 hours, 40 hour, 30 hour, or less than 25 hours, including any range between a lower and an upper range.

The applied potential may be any suitable potential for selectively removing the A-group element. The potential should selectively remove the A-group element from the MAX phase composition while at the same time preserving the substantially two-dimensional ordered array of cells having an empirical formula of $M_{n+1}X_n$ and/or minimizing the degradation of the electrolyte. In some embodiments, the potential is more than 0.80 V, 0.85 V, 0.90 V, 0.95 V, 1.00 V, 1.05 V, 1.10 V, 1.15 V, 1.20 V, 1.25 V, 1.30 V, 1.35 V, 1.40 V, 1.45 V, 1.50 V, 1.55 V, 1.60 V, 1.65 V, 1.70 V, 1.75 V, or 1.80 V. In some embodiments, the potential is less than 3.00 V, 2.95 V, 2.90 V, 2.85 V, 2.80 V, 2.75 V, 2.70 V, 2.65 V, 2.60 V, 2.55 V, 2.50 V, 2.45 V, 2.40 V, 2.35 V, 2.30 V, 2.25 V, 2.20 V, 2.15 V, 2.10 V, 2.05 V, 2.00 V, 1.95 V, 1.90 V, 1.85 V, 1.80 V, 1.75 V, 1.70 V, 1.65 V, 1.60 V, 1.55 V, 1.50 V, or 1.45 V. In certain cases, the potential is between 0.80 V, 0.85 V, 0.90 V, 0.95 V, 1.00 V, 1.05 V, 1.10 V, 1.15 V, 1.20 V, 1.25 V, 1.30 V, 1.35 V, 1.40 V, 1.45 V, 1.50 V, 1.55 V, 1.60 V, 1.65 V, 1.70

V, 1.75 V, or 1.80 V and 3.00 V, 2.95 V, 2.90 V, 2.85 V, 2.80 V, 2.75 V, 2.70 V, 2.65 V, 2.60 V, 2.55 V, 2.50 V, 2.45 V, 2.40 V, 2.35 V, 2.30 V, 2.25 V, 2.20 V, 2.15 V, 2.10 V, 2.05 V, 2.00 V, 1.95 V, 1.90 V, 1.85 V, 1.80 V, 1.75 V, 1.70 V, 1.65 V, 1.60 V, 1.55 V, 1.50 V, or 1.45 V, including any range between a lower and an upper range.

The electrochemical dissolution of A-group elements from MAX phase composition $M_{n+1}AX_n$ proceeds according to (eq 1):

$$M_{n+1}AX_n \leftrightarrows Lye^- + yA^{L+} + M_{n+1}A_{(1-y)}X_n \quad (1),$$

where L is the oxidation state of the A-group element in solution. By way of example, a $V_2AlC$ allows for the electrochemical dissolution of Al according to (eq 1A):

$$V_2AlC \leftrightarrows 3ye^- + yAl^{3+} + V_2Al_{(1-y)}C \quad (1A).$$

As demonstrated in the Examples, we performed electrochemical etching of $V_2AlC$ in an electrolyte composed of $AlCl_3$ dissolved in a second component of [EMIM]Cl ionic liquid. It is known that haloaluminate melts, e.g. as NaCl—$AlCl_3$, KCl—$AlCl_3$, imidazolium chloride-$AlCl_3$, pyrrolidium-chloride-$AlCl_3$, can be effectively used for the electrodeposition of aluminum. A molar ratio of $AlCl_3$ to the second component higher than 1, results in a Lewis acidic RTIL. A ratio of 1 or lower corresponds to neutral and basic liquid, respectively. In Lewis acidic RTILs comprising $AlCl_3$, the dominant chloroaluminate species is $[Al_2Cl_7]^-$ and its reduction leads to deposition of Al according to (eq. 2):

$$4Al_2Cl_7^- + 3e^- \leftrightarrows Al + 7AlCl_4^- \quad (2).$$

This reaction is reversible, and the reverse reaction is the electrochemical dissolution of Al. The conversion between $[Al_2Cl_7]^-$ and $[AlCl_4]^-$ according to (eq 3):

$$Al^{3+} + 7AlCl_4^- \leftrightarrows 4Al_2Cl_7 \quad (3)$$

bridges the reactions of eqns 1A and 2. This results in an overall reaction according to (eq 4):

$$V_2AlC \leftrightarrows yAl + V_2Al_{(1-y)}C \quad (4)$$

exemplifying the electrochemical etching the A-group element to prepare a MXene composition from the MAX phase composition.

Although this method is exemplified with the electrochemical etching of $V_2AlC$, those of skill in the art will appreciate that these methods can be extended to other MAX phase compositions. Suitably the MAX phase composition may be any of the MAX phase compositions described above. In some embodiments, the MAX phase composition comprises Al, including, without limitation, $Ti_2AlC$, $V_2AlC$, $Cr_2AlC$, $Nb_2AlC$, $Ta_2AlC$, $Ti_3AlC_2$, $V_3AlC_2$, $Ta_3AlC_2$, $Ti_4AlC_3$, $V_4AlC_3$, $Nb_4AlC_3$, $Ta_4AlC_3$, $Mo_2TiAlC_2$, $Cr_2TiAlC_2$, $Mo_2Ti_2AlC_3$, and any combination thereof.

MXene Batteries

Also disclosed herein are novel low-cost, high safety, and high capacity rechargeable aluminum batteries compromising cathodes comprising MAX phase or MXene materials. This invention can lead to possible commercialization of high-power and high-energy density rechargeable aluminum batteries for mobile electronic devices, electronic vehicles, and stationary power applications of future.

Aluminum batteries comprise one or more electrochemical cells. The electrochemical cells of the present technology comprise electrodes prepared from layered materials such as MXenes or MAX phase compositions. The electrochemical cell further comprises and electrolyte and an anode.

Suitably, the MXene or MAXphase composition may be any of the MXenes or MAXphase compositions previously described. In some embodiments, the MAX phase composition comprises Al, including, without limitation, $Ti_2AlC$, $V_2AlC$, $Cr_2AlC$, $Nb_2AlC$, $Ta_2AlC$, $Ti_3AlC_2$, $V_3AlC_2$, $Ta_3AlC_2$, $Ti_4AlC_3$, $V_4AlC_3$, $Nb_4AlC_3$, $Ta_4AlC_3$, $Mo_2TiAlC_2$, $Cr_2TiAlC_2$, $Mo_2Ti_2AlC_3$, and any combination thereof. In some embodiments the MXene composition comprises an MXene that may be prepare from a MAXphase composition comprising Al, including, without limitation, $Ti_2C$, $V_2C$, $Cr_2C$, $Nb_2C$, $Ta_2C$, $Ti_3C_2$, $V_3C_2$, $Ta_3C_2$, $Ti_4C_3$, $V_4C_3$, $Nb_4C_3$, $Ta_4C_3$, $Mo_2TiC_2$, $Cr_2TiC_2$, $Mo_2Ti_2C_3$, and any combination thereof. The MXene may comprise an expanded MXene, e.g., MXenese expanded by the intercalation of large organic bases such as tetrabutylammonium hydroxide (TBAOH), choline hydroxide, or n-butylamine.

The charging/dis-charging of the battery occurs because of the reversible intercalation or dissolution of A-group elements. Upon discharge of the battery, A-group elements will intercalate between the $M_{n+1}X_n$ layers, resulting in a layered material having an effective formula of $M_{n+1}A_yX_n$. Upon charging of the battery, A-group elements will dissolve into the electrolyte and reduce the A-group element content. The parameter y is usually less than 0.50 over the entirety of one or more charge/dis-charge cycles, but need not be. In some cases, y is less than 0.45, 0.40, 0.35, 0.30, or 0.25 over the entirety of one or more charge/dis-charge cycles.

Based on the total mass of the cathode and a three-electron charge transfer, the theoretical capacity of MXene cathodes can be calculated as shown below for bare $V_2C$ MXenes. The cathode discharge reaction in the Al-battery is (considering maximum intercalation of 1 mole Al per unit cell of MXene) (eq 4):

$$V_2C + Al \leftrightarrows V_2AlC \quad (4).$$

The theoretical capacity (C) of the cathode can be calculated as $$C = \eta / M_{V_2C} \quad (5)$$

where $\eta$ is number of electrons, F is Faraday's constant, and and $M_{V_2C}$ is the mass of the MXene. For bare $V_2C$, the capacity is 705.263 mAh g$^{-1}$. Similar methods can be performed to calculate the theoretical capacities of other MXenes, including MXenes with various surface terminations (Table 1). This demonstrates the high capacities that can be achieved from MXenes.

TABLE 1

Theoretical capacity of 2D MXenes as cathode materials for rechargeable aluminum batteries.

| Type | Parent MAX Phase | MXene | Theoretical Capacity (mAh/g) |
|---|---|---|---|
| Carbides | $Sc_2AlC$ | $Sc_2CF_2$ ** | 574.69 |
| | | $Sc_2CO_2$ ** | 600.44 |
| | | $Sc_2C(OH)_2$ ** | 591.60 |
| | $Ti_2AlC$ | $Ti_2CF_2$ | 551.73 |
| | | $Ti_2CO_2$ | 575.42 |
| | | $Ti_2C(OH)_2$ | 567.30 |
| | $V_2AlC$ | $V_2CF_2$ | 529.39 |
| | | $V_2CO_2$ | 551.16 |
| | | $V_2C(OH)_2$ | 543.71 |
| | $Nb_2AlC$ | $Nb_2CF_2$ | 340.96 |
| | | $Nb_2CO_2$ | 349.87 |
| | | $Nb_2C(OH)_2$ | 346.85 |
| | — | $Mo_2CF_2$ * | 332.41 |
| | | $Mo_2CO_2$ * | 340.87 |
| | | $Mo_2C(OH)_2$ * | 338.00 |

TABLE 1-continued

Theoretical capacity of 2D MXenes as cathode materials for rechargeable aluminum batteries.

| Type | Parent MAX Phase | MXene | Theoretical Capacity (mAh/g) |
|---|---|---|---|
| | $Cr_2AlC$ | $Cr_2CF_2$ ** | 522.14 |
| | | $Cr_2CO_2$ ** | 543.31 |
| | | $Cr_2C(OH)_2$ ** | 536.06 |
| | $Ti_3AlC_2$ | $Ti_3C_2F_2$ | 391.05 |
| | | $Ti_3C_2O_2$ | 402.80 |
| | | $Ti_3C_2(OH)_2$ | 398.81 |
| Nitrides | $Ti_2AlN$ | $Ti_2NF_2$ ** | 544.27 |
| | | $Ti_2NO_2$ ** | 567.31 |
| | | $Ti_2N(OH)_2$ ** | 559.42 |
| | $V_2AlN$ | $V_2NF_2$ ** | 522.52 |
| | | $V_2NO_2$ ** | 543.72 |
| | | $V_2N(OH)_2$ ** | 536.47 |
| | $Cr_2AlN$ | $Cr_2NF_2$ ** | 515.45 |
| | | $Cr_2NO_2$ ** | 536.08 |
| | | $Cr_2N(OH)_2$ ** | 529.02 |

* $Mo_2C$ MXene is synthesized from a non-Al based MAX phase ($Mo_2Ga_2C$), However, for the calculation of the theoretical capacity we consider the final structure to be similar to a "211" Al based MAX phase (i.e. $Mo_2AlC$).
** Synthesis of these MXenes have not yet been reported but their corresponding MAX phases are available.

Because there is a high theoretical capacity for MXene materials, it is possible to prepare batteries also possessing high capacities. In some cases, the batteries have a specific discharge capacity of at least 100 mAh/g, 150 mAh/g, 200 mAh/g, 250 mAh/g, 300 mAh/g, 350 mAh/g or 400 mAh/g at a current density of 100 mA/g. The batteries may also possess large average discharge voltages. In some cases, the average discharge voltages is at least 0.5 V, 0.6 V, 0.7 V, 0.8 V, 0.9 V, 1.0 V, 1.1 V, 1.2 V, 1.3 V, 1.4 V, or 1.5 V. The batteries may also be cycled numerous times and maintain at a columbic efficiency of at least 80%. In some embodiments, the batteries maintain a columbic efficiency of at least 80% over, at least 85%, at least 90% over 100 cycles. The batteries may also possess any combination of characteristics described herein.

As demonstrated in the examples, we prepared a rechargeable Al battery with two-dimensional (2D) and layered vanadium carbide MXene ($V_2CT_x$) as the cathode, aluminum metal as the anode, and a nonflammable ionic liquid consisting of a mixture of aluminum chloride ($AlCl_3$) and 1-ethyl-3-methylimidazolium chloride ([EMIm]-Cl) as the electrolyte. As battery electrode materials, various MXenes have shown high performance as anodes for lithium- and sodium-ion batteries. Although it has been shown that their charge storage mechanism is based on the intercalation of cations, MXenes have mostly shown capacitor-type behaviors without distinct charge-discharge plateaus when tested as battery electrodes. Here we demonstrate the high potential of MXenes as cathode materials for Al batteries. The batteries demonstrated here operate through (de)-intercalation of $Al^{3+}$ cations between $V_2CT_x$ layers and show a high average discharge voltage of 1.2 V and a distinct charge plateau at around 1.4 V (V vs $Al/Al^{2+}$). We show that after delamination of multilayered $V_2CT_x$ to few-layer 2D sheets, the cathodes can deliver specific capacities of more than 300 mAh $g^{-1}$.

Electrochemical Cells

Electrochemical cells for use in electrochemically synthesizing MXene compositions or for use in batteries each comprise electrodes comprising a layered material having a plurality of layers. The layers comprise a substantially two-dimensional ordered array of cells having an empirical formula of $M_{n+1}X_n$. As explained above, M comprises a transition metal selected from the group consisting of a Group IIIB metal, a Group IVB metal, a Group VB metal, a Group VIB metal, and any combination thereof, X is $C_xN_y$, wherein x+y=n, and n is equal to 1, 2, or 3. The layered material may alternatively be characterized as having an empirical formula of $M_{n+1}A_yX_n$, wherein M, X, and n is same as described immediately above; A is an A-group element, and y is any number between 0.0 and 1.0.

For electrochemical cell for synthesizing MXene compositions, the electrode comprising the layered material is a working electrode and electrochemical cell further comprises a counter electrode and, optionally, a reference electrode. Applying a potential across the working and counter electrodes as described above results the removal of A-group elements. The counter electrode may suitably be comprised a many different materials provided that it does not undesirably react with the electrolyte or other cell component. In the Examples below, Mo was used but other metals, alloys, or other electrically conducting materials. The reference electrode, may suitably be comprised a many different materials provided that it does not undesirably react with the electrolyte or other cell component. In the Examples below, Al was used but other metals, alloys, or other electrically conducting materials. Those of skill in the art will be able to select counter electrode or reference electrode materials depending on the particular application.

For electrochemical cell for batteries, the electrode comprising the layered material is a cathode and electrochemical cell further comprises an anode. Charging the battery as described above results the removal of A-group elements, while discharging the battery results in the intercalation of A-group elements between the layers. The anode may suitably be comprised a many different materials provided that it does not undesirably react with the electrolyte or other cell component. For aluminum batteries, in particular, the anode is preferably comprised of Al, an Al alloy, a material capably of intercalating Al, or a material capable of alloying with Al.

The electrolyte within the electrochemical cell will be tailored to the particular application and components within the electrochemical cell. In some cases the electrolyte is a room-temperature ionic liquid (RTIL). "Room-temperature ionic liquid" or "RTIL" refers to salts that liquefy below 373 K. The interest in these materials stems from their favorable physicochemical properties, such as low-flammability, negligible vapor pressure, relatively high ionic conductivity, and high electrochemical stability.

RTILs may be prepared from a Lewis Acid and a Lewis base. The Lewis acid may be any chemical species capable of accepting an electron pair to from a Lewis base to form a Lewis adduct. RTILs may be prepared by the mixing of the Lewis Acid with a salt of a Lewis base. The salt's anionic Lewis base can reversibly react with the Lewis acid to form an anionic adduct, resulting the RTIL comprising the anionic adduct and the salt's cation.

Many Lewis acids are known in the art, including metal containing Lewis acids capable of forming an RTIL. Examples of metal containing Lewis acids capable of forming ionic liquids include, without limitation, Group IIIA halometallates or a Group IVA metalhalide. Exemplary Group IIIA halometallates include, without limitation, haloaluminates, halogallates, and haloindates such as $AlC_3$, $AlBr_3$, $GaCl_3$, or $InCl_3$. Exemplary Group IVA metalhalides include, without limitation, silicon halides and germainium halides such as $SiCl_4$ or $GeCl_4$.

The salt comprising the Lewis base may be any suitable Lewis base that can form an ionic liquid with the selected Lewis acid. Lewis bases capable of forming ionic liquids, include without limitation, halides such as F, Cl, and Br; fluorous-anions such as $PF_6^-$, $BF_4^-$, $CF_3SO_3^-$; or $(CF_3SO_3)_2N^-$, or non-fluorous anions such as alkylsulfates. In some embodiments, the salt may also comprise a nitrogen containing organic cation such as an imidazolium, a pyridinium, an ammonium, a pyrrolidinium, or any combination thereof. Examples include, without limitation, 1-ethyl-3-methylimidazolium, 1-butyl-3-methylimidazolium, or 1-(1-butyl)pyridinium. In other embodiments, the salt may comprise an alkali cation such as $Li^+$, $Na^+$, $K^+$, or any combination thereof. Exemplary salt include, without limitation, 1-ethyl-3-methylimidazolium chloride, 1-butyl-3-methylimidazolium chloride, or 1-(1-butyl)pyridinium chloride, LiCl, NaCl, or KCl.

In other embodiments, the electrolyte may comprise a deep eutectic solvent (DES). A "deep eutectic solvent" or "DES" is a metallifeorous solution composed of cations and anions vis disproportionation process. The DES may be prepared by mixing a Lewis Acid, such as any of the Lewis acids described above, and a polar molecule. The polar molecule may be any suitable polar molecule capable of forming a DES, including, without limitation, urea, dimethylsulfone, an amide, a glyme, or any combination thereof.

In particular embodiments, the Lewis acid is a haloaluminate $AlX_3$, where X is Cl or Br. RTILs or DESs may be prepared from the mixing of the haloaluminate with a salt or polar molecule as explained above. The haloaluminate should be mixed with a sufficient amount of the salt or polar molecule to prepare a reducible $[AlX_4]^-$ or $[Al_2X_7]^-$ haloalumine. In electrolytes comprising chloroaluminates, for example, Al and Al alloy coatings can be prepared from those containing more than 50 mol % $AlCl_3$, i.e., Lewis acidic RTILs in which the reducible $[Al_2Cl_7]^-$ ion exists (as shown in eqn 2). Although the $[AlCl_4]^-$ ion, which is a major constituent of these electrolytes, is in principle reducible to Al, the organic cation component is typically reduced at more positive potentials than this ion. Thus reduction of $[AlCl_4]^-$ is typically only seen in metal halide-$AlC_3$ electrolytes. Thus its often preferable for the $[Al_2Cl_7]^-$ ion to be present. The reactivity of the haloaluminates as well as their adjustable Lewis acidity make them well suited for the applications described herein.

The molar ratio of the Lewis acid to the Lewis base or polar molecule determines the acidity of the electrolyte and the concentration of the ion species. When the molar ratio of Lewis acid to Lewis base or Lewis acid to polar molecule is greater than 1.0, the electrolyte is acidic. Suitable molar ratios of Lewis acid to Lewis base or polar molecule are typically greater than 1.0. In some embodiments, the molar ratio is between 1.0 and 2.0, including within 1.2 and 1.8 or 1.2 to 1.6.

Exemplary electrolytes include those described in the following references: Electrochemistry, 82(11):946-948 (2014); ACS Appl. Mater. Interfaces 8: 27444-27448 (2016); Journal of The Electrochemical Society, 164 (8):H5007-H5017 (2017); Proc Natl Acad Sci 114(5):834-839 (2017); Angewandte Chemie 130(7):1916-1920 (2017); Chem 4(3): 586-598 (2018); and Chem. Commun., 54:4164-4167 (2018).

The electrodes, whether the working electrode or the cathode, may further comprise an electrically conducting additive, a binder or both. In some embodiments, the binder material comprises a polymer selected from the group consisting of: styrene-butadiene rubber (SBR); polyvinylidene fluoride (PVDF); polytetrafluoroethylene (PTFE); copolymer of tetrafluoroethylene, hexafluoropropylene, and vinylidene fluoride; copolymer of hexafluoropropylene and vinylidene fluoride; copolymer of tetrafluoroethylene and perfluorinated vinyl ether; methyl cellulose; carboxymethyl cellulose; hydroxymethyl cellulose; hydroxyethyl cellulose; hydroxypropylcellulose; carboxymethylhydroxyethyl cellulose; nitrocellulose; colloidal silica; and combinations thereof. In some embodiments, binder material comprises PVDF.

In some embodiments, the electron-conducting additive is a carbon or graphitic material. In some embodiments, the carbon or graphitic material is selected from the list consisting of: a graphite, a carbon black, a graphene, and a carbon nanotube. In some embodiments, the carbon or graphitic material is a graphite selected from the group consisting of: graphite worms, exfoliated graphite flakes, and expanded graphite. In some embodiments, the carbon or graphitic material is chemically-etched or expanded soft carbon, chemically-etched or expanded hard carbon, or exfoliated activated carbon. In some embodiments, the carbon or graphitic material is a carbon black selected from the group consisting of: acetylene black, channel black, furnace black, lamp black thermal black, chemically-etched or expanded carbon black, and combinations thereof. In some embodiments, the carbon or graphitic material is a carbon nanotube selected from the group consisting of: chemically-etched multi-walled carbon nanotube, nitrogen-doped carbonnanotube, boron-doped carbon nanotube, chemically-doped carbonnanotube, ion-implanted carbon nanotube, and combinations thereof. In some embodiments, the electron-conducting additive comprises carbon black.

In some embodiments, the electrode is comprised by comprise between 1-99 wt % of the layered material (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, or any ranges therebetween) or consists essentially of the layered material. In some embodiments, the layered material is 50-99 wt %, 60-95 wt %, 70-90 wt %, or 75-85 wt %. In some embodiments, the binder material is 1-25 wt % (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, or any ranges therebetween) of the electrode material. In some embodiments, the binder material is 5-15 wt % of the cathode material. In some embodiments, the electron-conducting additive is 1-99 wt % (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, or any ranges therebetween) of the electrode material. In some embodiments, the electron-conducting additive is 1-50 wt %, 1-40 wt %, 1-30 wt %, 1-25 wt %, or 5-15 wt % of the electrode material. In certain embodiments, the electrode comprises 50-98 wt % layered material, 1-25 wt % binder, and 1-25 wt % of the electron-conducting additive, 60-95 wt % layered material, 1-25 wt % binder, and 1-25 wt % of the electron-conducting additive, 70-90 wt % layered material, 5-15 wt % binder, and 5-15 wt % of the electron-conducting additive.

In some embodiments, the electrode material is disposed on an electrically conducting substrate. Many substrates may be suitable for such purpose such as a metal (including without limitation Mo, Ta, or Pt), an alloy, or an electrically conducting carbon such as the carbon paper used in the Examples below.

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein. Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Example 1: Electrochemical Etching of MAX Phase Composition to Prepare a MXene

The present Example demonstrates the electrochemical etching of a MAX phase composition to prepare an MXene.

We performed electrochemical etching of $V_2AlC$ in an electrolyte composed of $AlCl_3$ dissolved in [EMIM]Cl ionic liquid. We tested the idea that this electrochemical reaction can be used for the removal of Al from MAX phases by electrochemical etching of $V_2AlC$ in an acidic [EMIM]Cl—$AlCl_3$ electrolyte ($AlCl_3$/[EMIM]Cl molar ratio of 1.3).

Figure 1B:
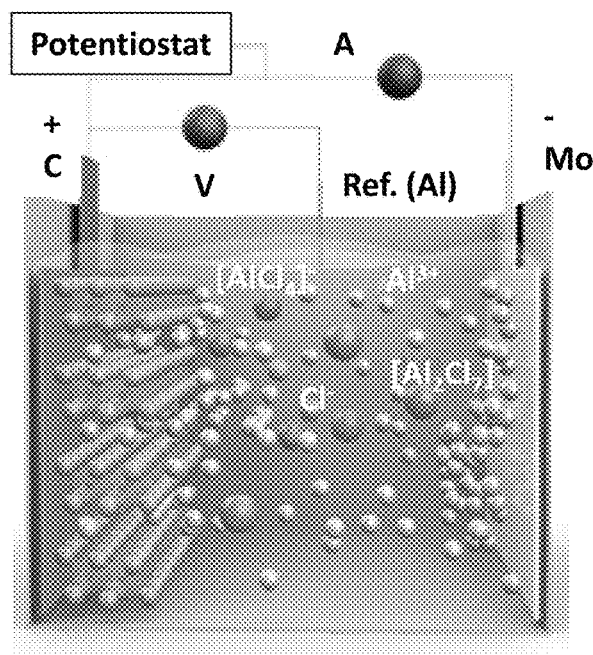
Figure 1C:
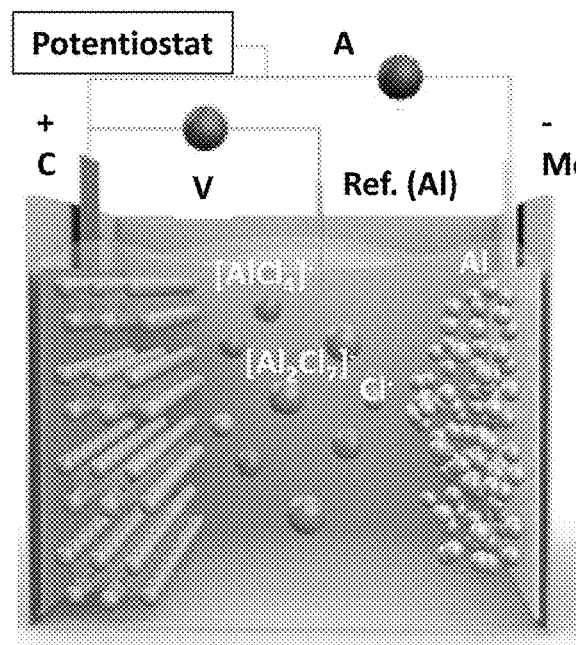

Electrodes were made by casting a mixture of $V_2AlC$ MAX phase, binder and conductive additives on carbon papers. The carbon is inert to [EMIM]Cl—$AlCl_3$ electrolyte at potentials lower than 2.5 V. The electrochemical cell was formed with Mo as the counter electrode an Al foil as the reference electrode. FIGS. 1A-1C.

Figure 2A:
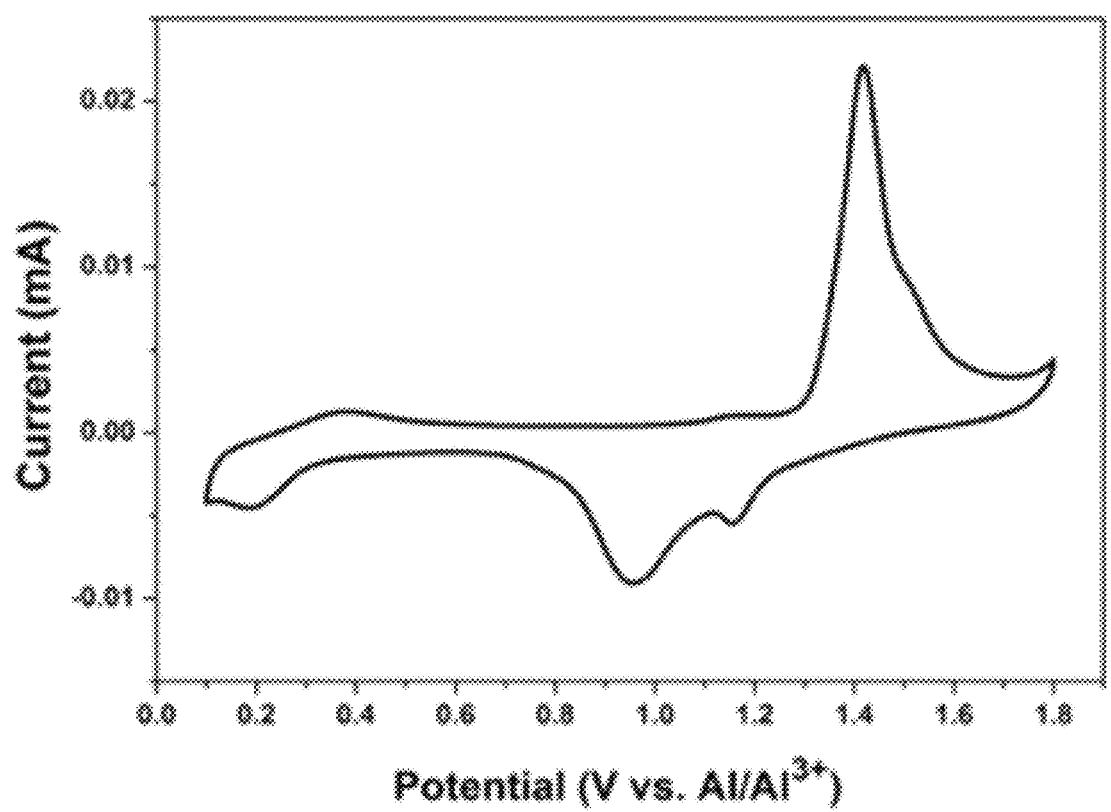
FIG. 2A shows the cycle voltammetry of MXene in [EMIM]Cl—$AlCl_3$ electrolyte.

The cyclic voltammetry studies on a typical electrode showed a distinctive peak at about 1.4 V vs $Al/Al^{3+}$ during oxidation corresponding to the dissolution of Al from $V_2AlC$ and two peaks at about 1.2 V and 0.9 V vs. $Al/Al^{3+}$ during reduction, corresponding to the deposition of Al on $V_2AlC$ electrodes. FIG. 2A. The CV studies indicated the possibility of removing Al from $V_2AlC$ by applying an anodic potential of higher than 1.4 V vs. $Al/Al^{3+}$. Therefore, we applied a pulsed anodic potential of 1.8 V vs. $Al/Al^{3+}$ to $V_2AlC$ electrodes for about 20 h to etch Al atoms out of $V_2AlC$ structure according to the process shown in FIGS. 1A-1C.

Figure 2B:
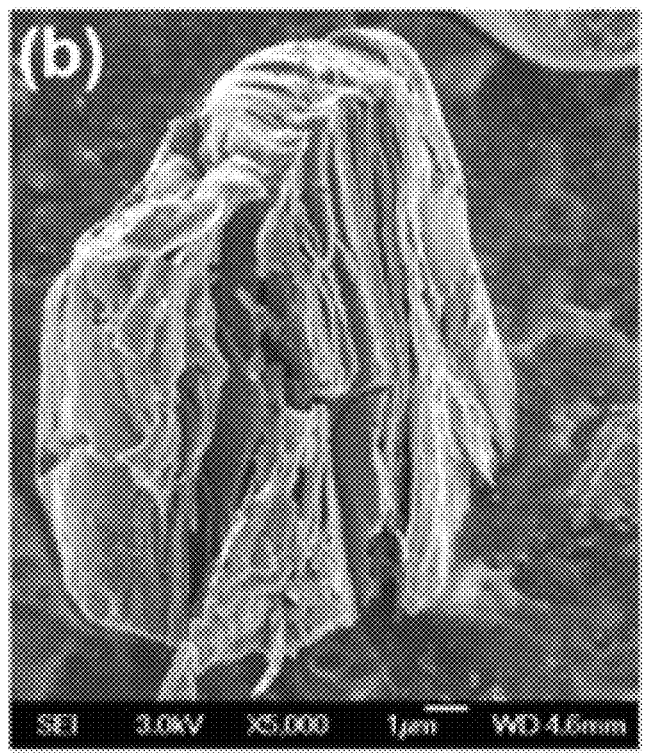
FIG. 2B shows an SEM images of an electrochemically etched $V_2AlC$ particle.
Figure 2C:
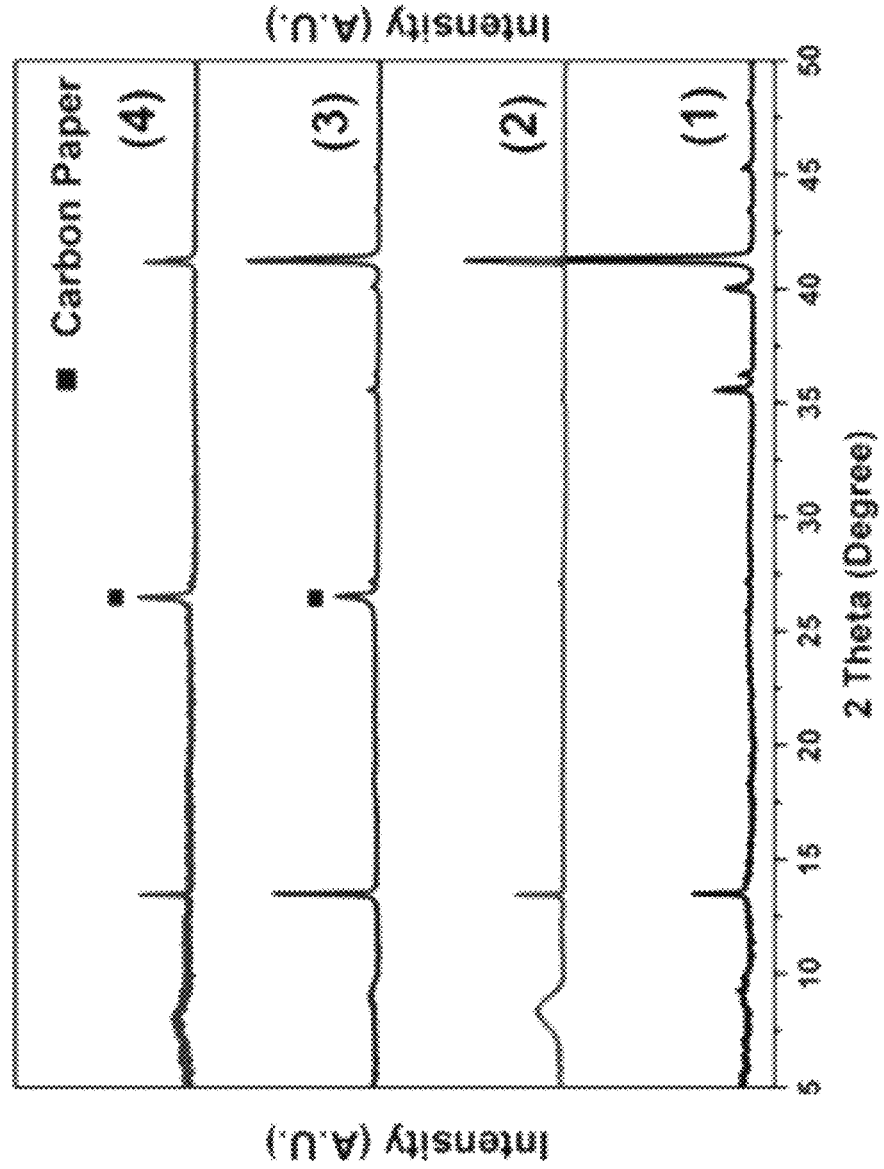
FIGS. 2C-2D show XRD patterns of (1) $V_2AlC$ MAX powder, (2) $V_2CT_x$ synthesized by chemical etching of $V_2AlC$ in concentrated HF solution, (3) a $V_2AlC$ electrode casted on carbon paper, and (4) electrochemically etched $V_2AlC$.
Figure 2D:
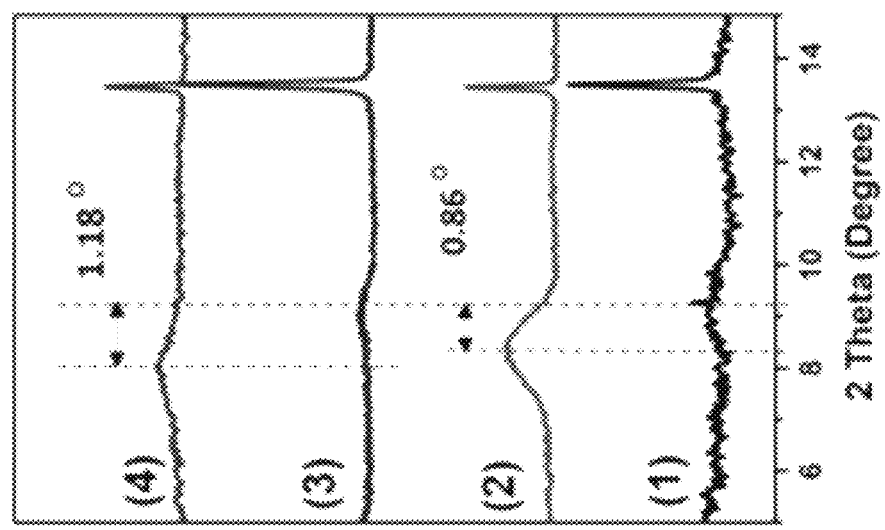

The X-ray diffraction (XRD) patterns of the electrode before and after etching are compared to the XRD patterns of the precursor $V_2AlC$ powder and a $V_2CT_x$ MXene sample (synthesized by etching $V_2AlC$ in a 50 wt. % HF solution for 86 hours) in FIGS. 2C-2D. The XRD pattern of conventionally synthesized $V_2CT_x$ shows some unreacted $V_2AlC$ along with a new broad peak at 20 of around 8.33°. This peak can be assigned to the (0002) plane of $V_2CT_x$ and translates to a c-lattice parameter (c-LP) of 21.2 Å. The comparison of the XRD patterns of $V_2AlC$ electrodes before and after etching shows the appearance of a similarly small and broad peak at corresponding to (0002) with a peak shift of about 1.08°.

FIG. 2B shows the SEM image of a $V_2AlC$ particle separated from the electrochemically etched electrode after sonication in N-Methyl-2-pyrrolidone (NMP) to wash and separate the particles from carbon additives and binder. This image clearly shows the exfoliation of $V_2CT_x$ layers after the electrochemical etching. However, some of other images of the particles did not show the exfoliation of particles, indicating that with the condition used in this experiment electrochemical etching was not complete.

Figure 3A:
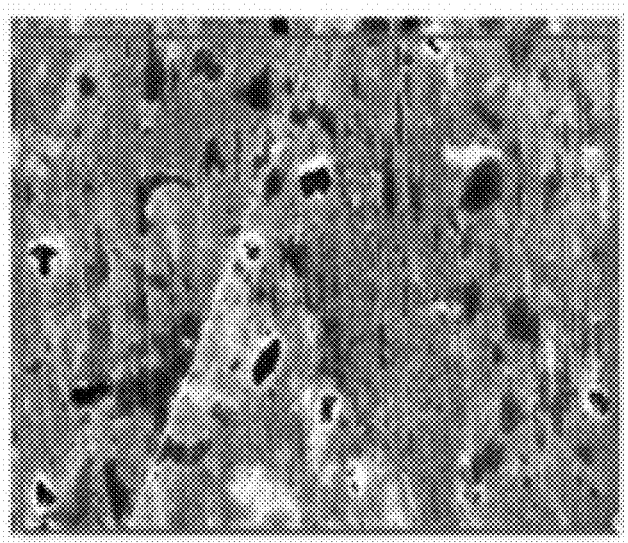
FIGS. 3A-3C show SEM image (FIG. 3A) and EDS mapping for Mo (FIG. 3B) and Al (FIG. 3C) on the Mo counter electrode indicating the deposition of the Al on the counter electrode during the electrochemical etching of $V_2AlC$ working electrode.
Figure 3B:
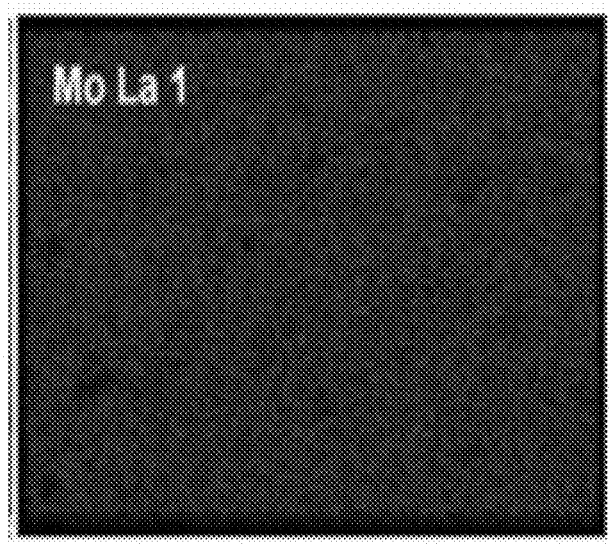
Figure 3C:

FIG. 3A shows an SEM images of a Mo counter electrode used in the electrochemical etching of $V_2AlC$ electrode. FIGS. 3B-3C show the elemental mapping of same electrode by Energy dispersive X-ray spectroscopy (EDS). These images confirm the deposition of the Al on the counter electrode and indirectly indicate the dissolution of the Al atoms from $V_2AlC$ working electrode during electrochemical etching. It is worth noting that when we used carbon paper as the working electrode, no Al deposition on the counter electrode was detected. EDS was also used to estimate a V:Al atomic ratio of 4.25:1 for the electrochemically etched $V_2AlC$, confirming a significant decrease of Al after etching. Characterization of samples after electrochemical etching shows that the Al atoms can be removed from $V_2AlC$ using this method, which confirms that the use of the electrochemical etching to produce MXenes.

Example 2: Preparation of an Aluminum Battery Comprising a MXene Cathode

Figure 4A:
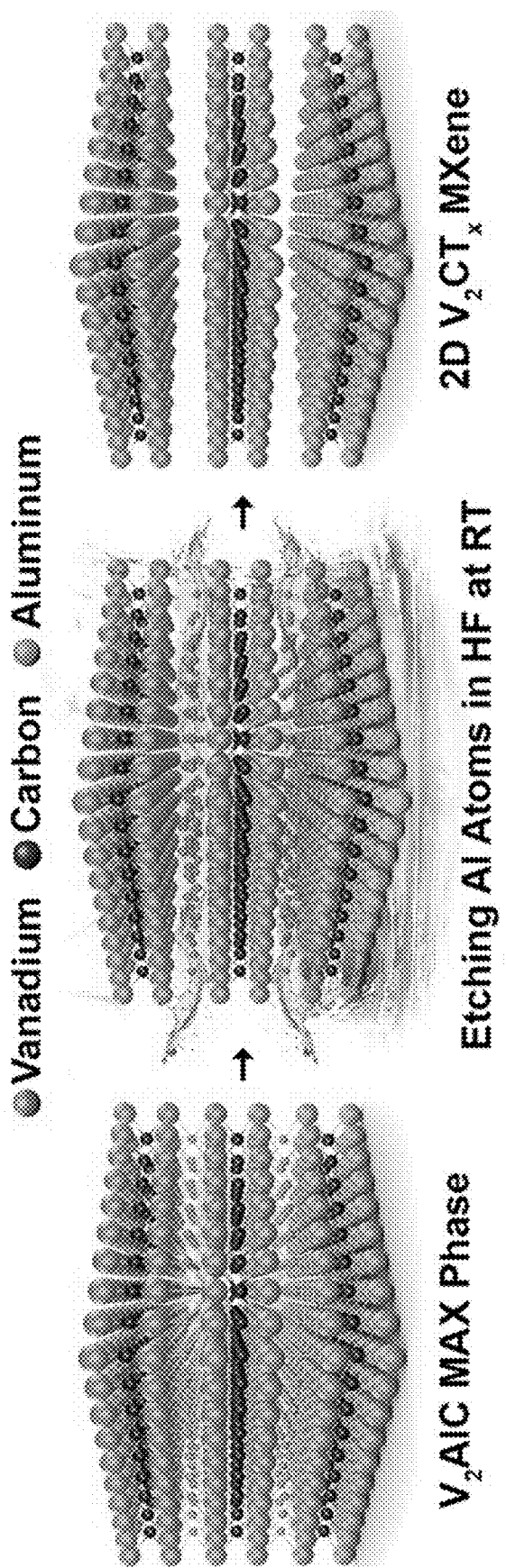
FIG. 4A provides a schematic illustration of the selective etching process used to synthesize $V_2CT_x$MXene from $V_2AlC$ MAX phase.
Figure 4D:
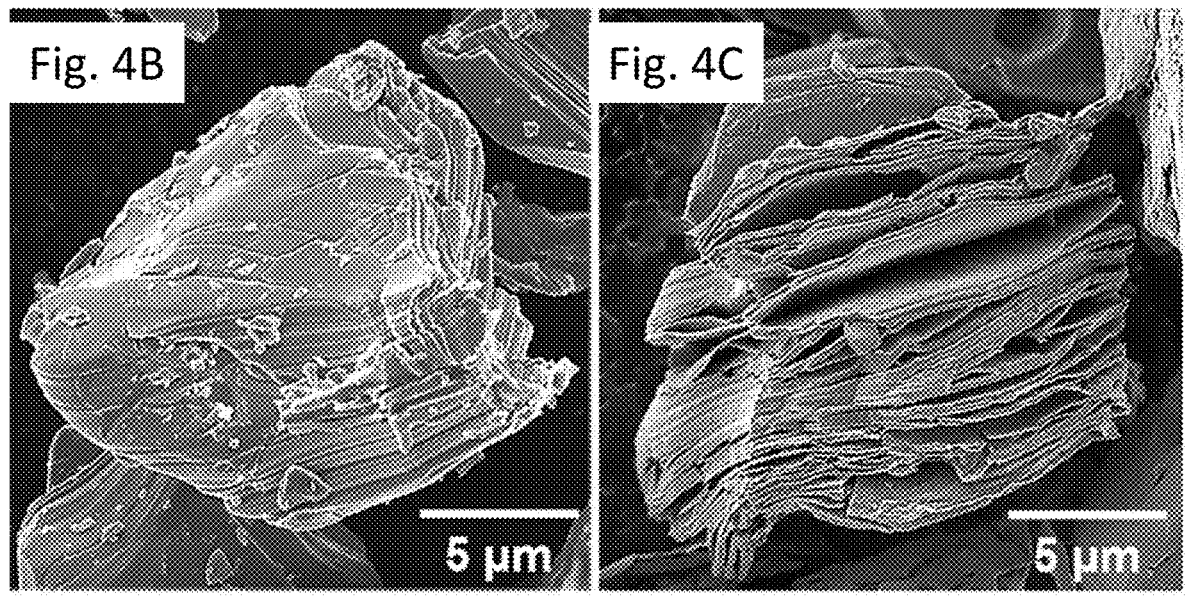
FIG. 4D shows XRD patterns of $V_2AlC$ before and after HF treatment ($V_2CT_x$ MXene). Asterisk (*) denotes the remaining MAX phase residual in the etched powder FIG. 5 provides a schematic illustration of the proposed mechanism for an Al battery with $V_2CT_x$ MXene as the cathode during discharge in 1.3:1 $AlCl_3$/[EMIm]Cl ionic liquid electrolyte.
Figure 4D:
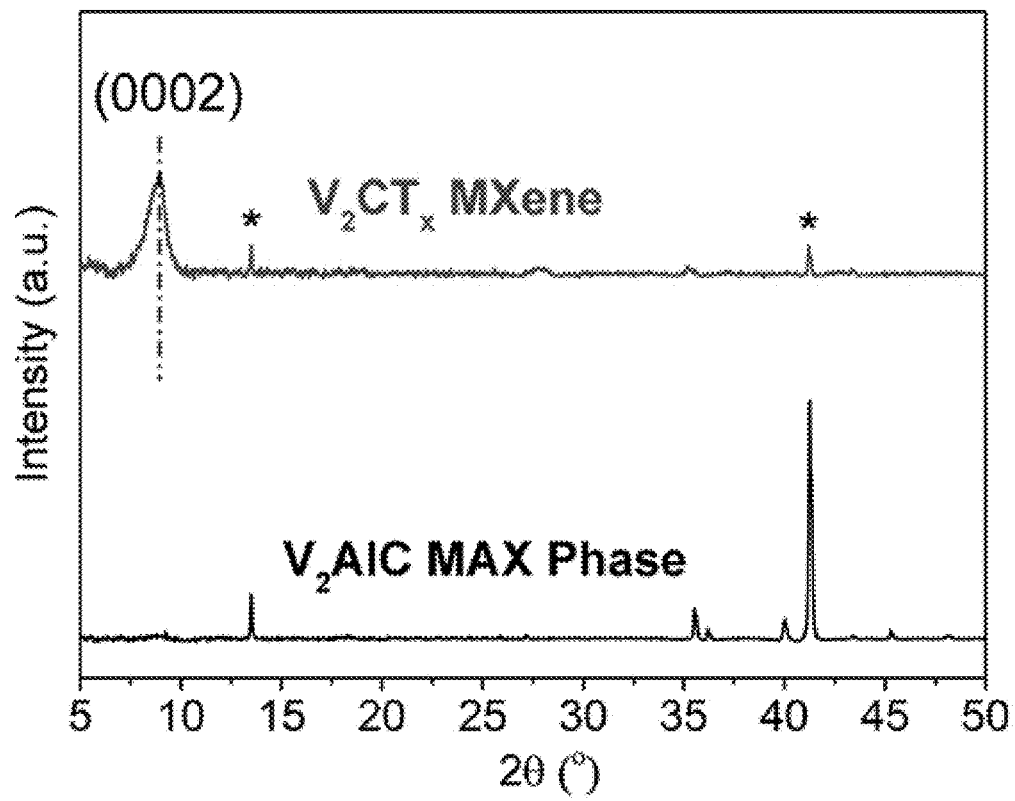
Figure 5:
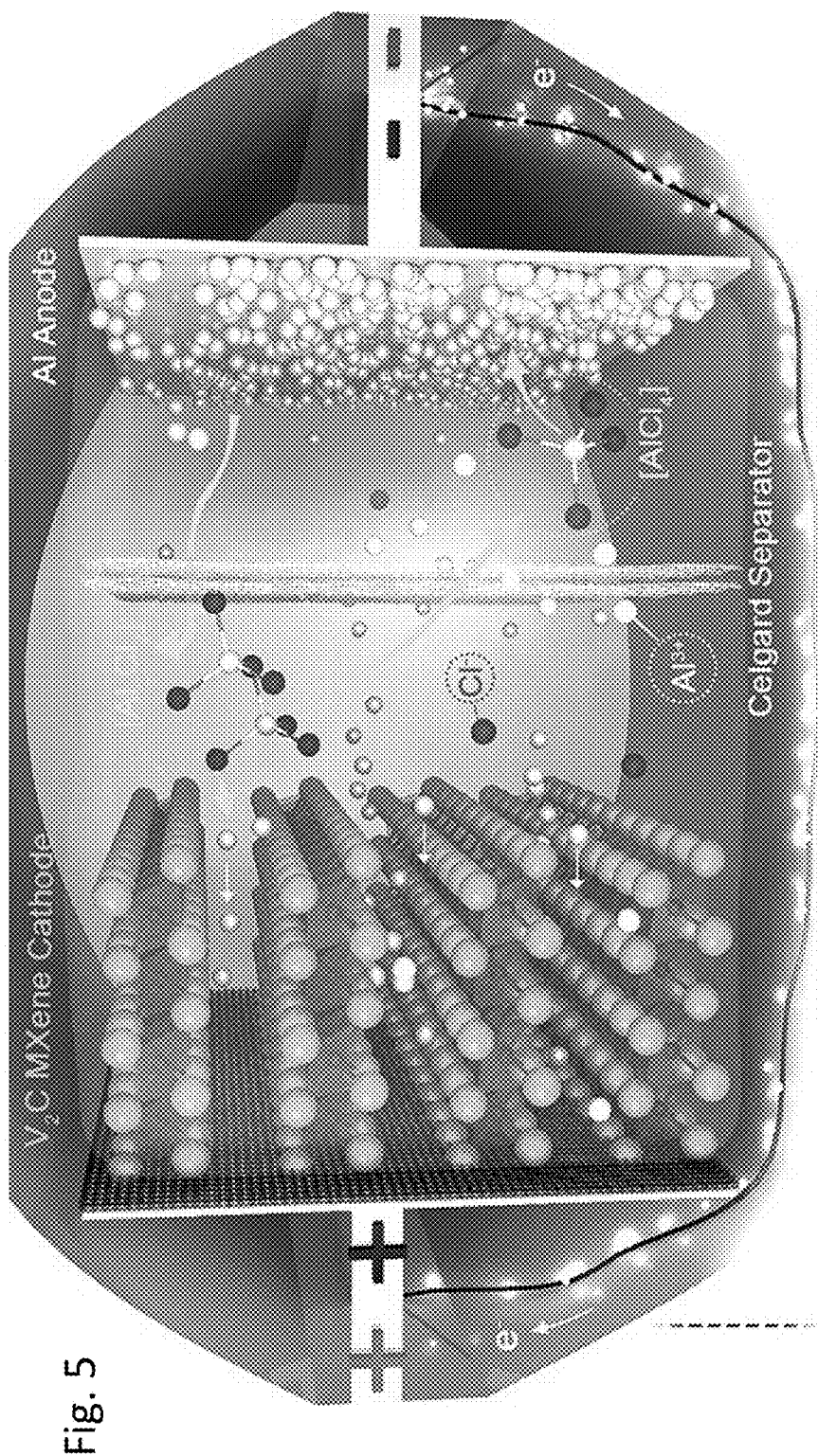
Figure 5:
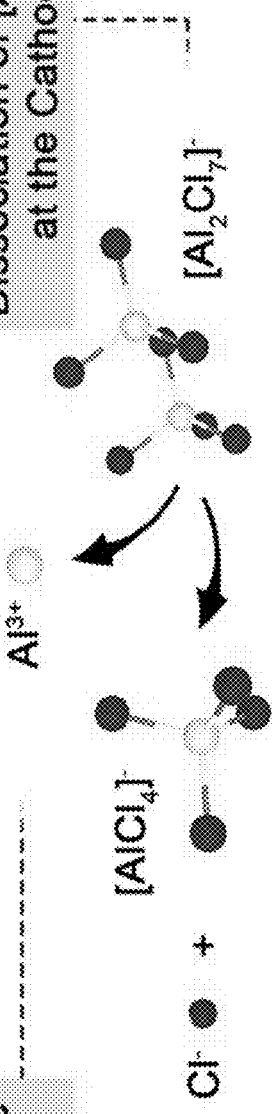

FIG. 4A schematically shows the synthesis method of $V_2CT_x$ MXene, where Al atoms are selectively etched from $V_2AlC$ structure through immersing the MAX phase powder in a concentrated hydrofluoric (HF) acid solution at room temperature. FIGS. 4B-4C shows scanning electron microscopy (SEM) images of typical $V_2AlC$ particles before and after etching in HF for 92 h, respectively. The typical accordion-like multilayered structure observed for the etched MAX phases indicates the successful synthesis of $V_2CT_x$ MXenes. This sample was denoted as multilayered (ML) $V_2CT_x$. Upon etching $V_2AlC$ powder and the removal of Al layers from $V_2AlC$, the XRD pattern of etched particles showed a peak corresponding to the (0002) plane of $V_2CT_x$ MXene, whereas the intensity of the MAX phase peaks decreased significantly (FIG. 4D). The presence of small peaks corresponding to $V_2AlC$ in the XRD pattern of the etched powder indicates the existence of a small amount of unreacted MAX phase in the final product, consistent with previous reports on the synthesis of $V_2CT_x$. The synthesized $V_2CT_x$ powder was cast on porous carbon paper substrate and used as the cathode in an Al battery cell, where high-purity aluminum foil was the anode and AlCl3/[EMIm]Cl ionic liquid (with a 1.3:1 AlCl3/[EMIm]Cl molar ratio) was used as the electrolyte. FIG. 5 schematically shows the components and the operation mechanism of the fabricated aluminum batteries.

In the $AlCl_3$/[EMIm]—Cl ionic liquid electrolyte, the main anionic species are $[AlCl_4]^-$ and $[Al_2Cl_7]^-$ chloroaluminates, where the concentration of the latter is higher in acidic mixtures ($AlCl_3$ to [EMIm]Cl ratio of higher than 1), enabling reversible plating and stripping of the aluminum. During the electrolyte interface (eq I) and Al cations intercalate between the MXene layers (eq II). Meanwhile, on the anode side of the cell, aluminum metal reacts with $[AlCl_4]^-$ anions to form $[Al_2Cl_7]^-$ anions and release three electrons (eq III).

Proposed Cathode Reactions:

$$4Al_2Cl_7^- \leftrightarrows Al^{3+} + 7AlCl_4^- \qquad (I)$$

$$V_2CT_x + yAl^{3+} + 3ye^- \rightarrow V_2AlCT_x \qquad (II)$$

Proposed anode reaction:

$$Al + 7AlCl_4^- \leftrightarrows 4Al_2Cl_7^- + 3e^- \qquad (III)$$

Figure 6A:
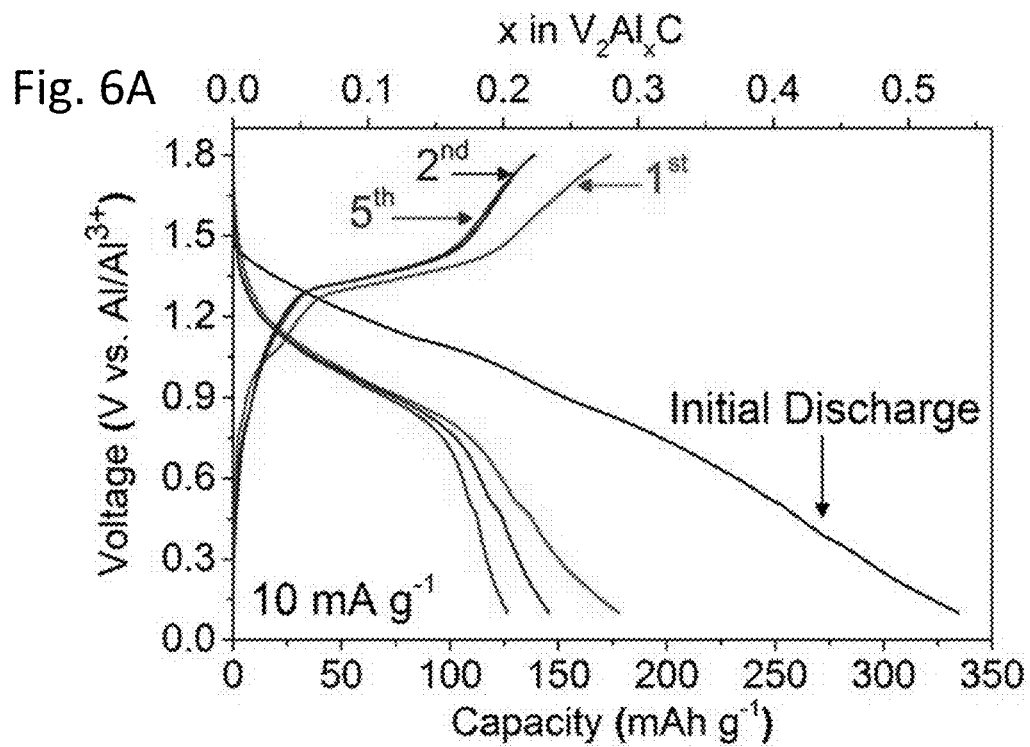
FIG. 6A shows the initial discharge and the following charge-discharge cycles of a ML-$V_2CT_x$ cathode for the first, second, and the fifth cycles at a current density of 10 mA $g^{-1}$.
Figure 6B:
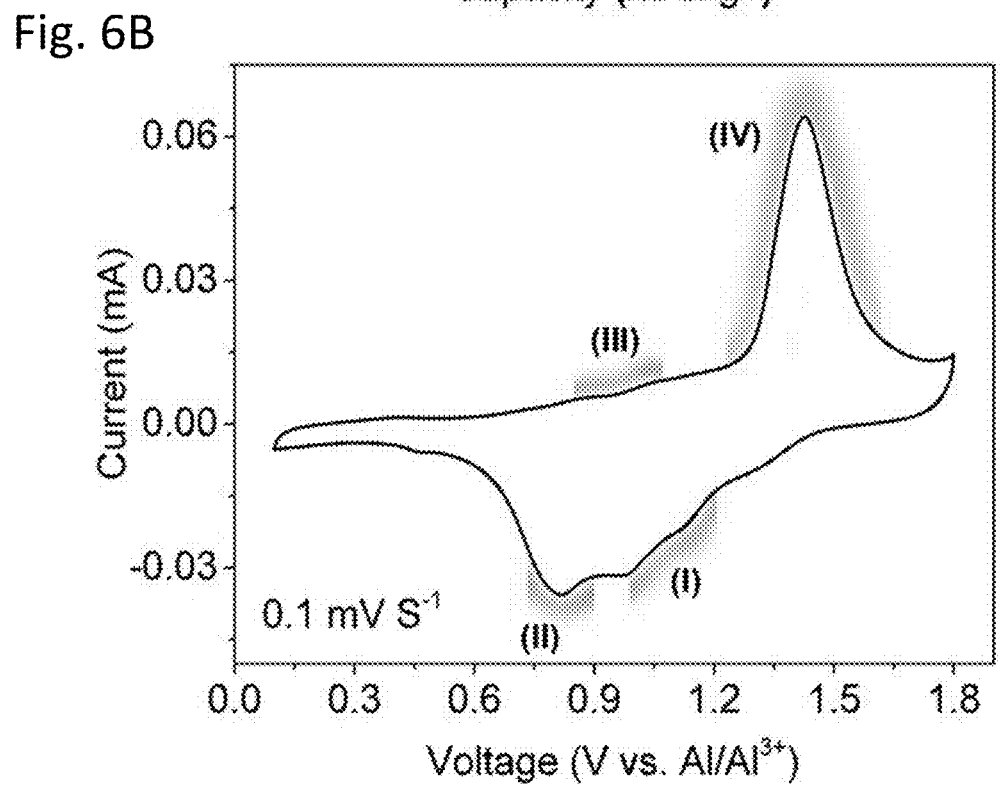
FIG. 6B shows a CV curve of a ML-$V_2CT_x$ cathode at a scan rate of 0.1 mV $s^{-1}$ in a voltage range of 0.1-1.8 V (V vs Al/$Al^{3+}$).
Figure 6C:
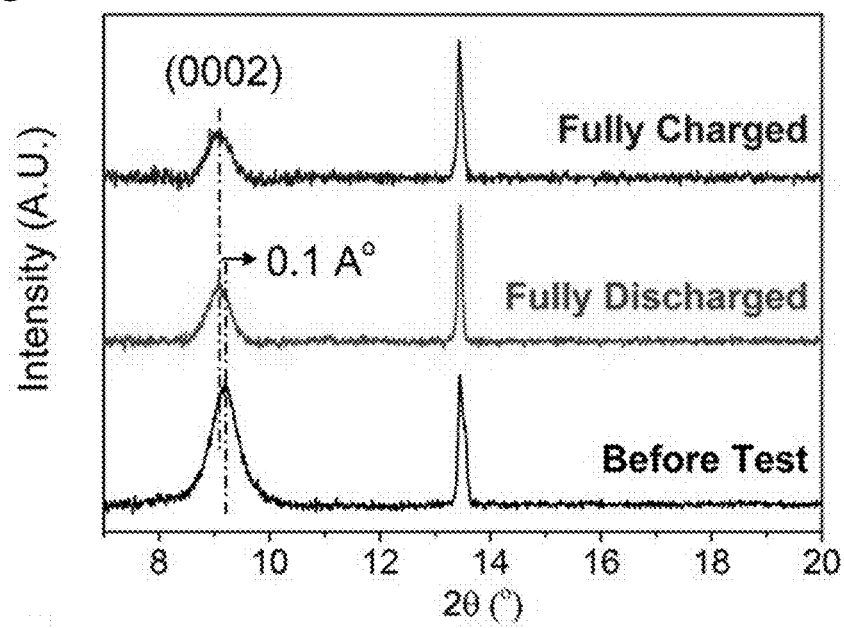
FIG. 6C shows XRD patterns of $V_2CT_x$ electrodes in different states of charge showing a negligible increase (~0.1 Å) in the d-spacing upon $Al^{3+}$ intercalation.
Figure 6D:
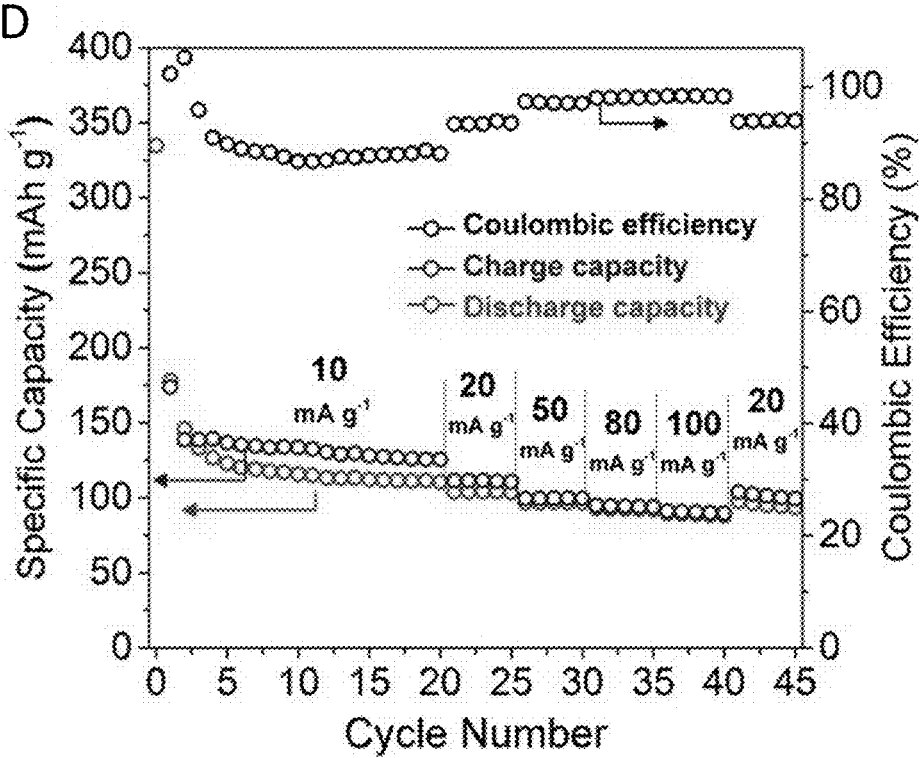
FIG. 6D shows cyclic performance and rate capability of a ML-$V_2CT_x$ cathode at different current densities, showing a discharge capacity of around 112 mAh $g^{-1}$ with Coulombic efficiency of ~90% after 20 cycles at a current density of 10 mA $g^{-1}$.

FIG. 6A shows the charge-discharge profiles of an ML-$V_2CT_x$ cathode at a current density of 10 mA g$^{-1}$. In the initial discharge, a large irreversible capacity of ~335 mAh g$^{-1}$ was observed, possibly due to dissociation of chloroaluminate anions and other electrolyte components that may form a solid electrolyte interface. The initial discharge capacity dropped to about 178 mAh g$^{-1}$ in the first cycle (corresponding to $V_2Al_{0.26}CT_x$). The charge and discharge profiles of the cell in the first cycle show broad plateaus that correspond to the observed cathodic and anodic peaks in the cyclic voltammetry (CV) tests. The CV curve of the cell (FIG. 6B) shows two broad cathodic peaks at 1.2-1 V (I) and 0.9-0.8 V (II) and corresponding anodic peaks at ~1 V (III) and 1.4 V (IV). After the first cycle, the specific capacity decreased at a much lower rate down to 112 mAh g$^{-1}$ after 20 cycles (FIG. 6D). Also, the Coulombic efficiency of the cell dropped from 100% in the first few cycles to around 90% in the fourth cycle. Ex situ X-ray diffraction (XRD) analysis of the electrodes after discharging to 0.1 V and after charging to 1.8 V did not show any change from the original pattern of the 2D $V_2CT_x$ cathode (FIG. 6C), suggesting the absence of phase transition and a storage mechanism based on the intercalation of ions into the cathode.

After discharge, the (0002) peak of the $V_2CT_x$ MXene (originally at 2θ=9.210) downshifted to 2θ=9.110, which corresponds to about 0.21 Å increase in the c-lattice parameter (c-LP) of the $V_2CT_x$ upon discharge. Because a unit cell of MXene contains two layers of $V_2CT_x$, this increase in c-LP corresponds to about 0.10 Å increase in the interlayer distance. However, no change in the c-LP of the electrode was observed after the subsequent charge. Interestingly, the increase in the interlayer spacing of $V_2CT_x$ is much lower compared to the change observed for MXenes intercalated with other cations (such as Li$^+$ and Na$^+$). For instance, a $V_2CT_x$ electrode shows up to 4.6 Å increase in its c-LP when intercalated with Na ions. Based on this observation and other evidence discussed below, we suggest that Al$^{3+}$ cations are the main intercalating species into MXene cathodes. Therefore, intercalation (or co-intercalation) of large $[AlCl_4]^-$ and $[Al_2Cl_7]^-$ chloroaluminate anions (~5.28 and ~7.02 Å, respectively) or EMI+ cations (~7 Å), which is observed for some of the other Al-battery cathode materials, may not happen in the case of MXenes.

High-resolution transmission electron microscopy (HR-TEM) images of the $V_2CT_x$ electrodes before testing and after discharge and charge are shown in FIGS. 7A-7C. A very marginal increase in the d-spacing of the $V_2CT_x$ was observed upon discharge, whereas no change in the interlayer spacing (ca. ~0.97 nm) or structure of the $V_2CT_x$ MXene was observed after subsequent charge, which is in good agreement with the XRD results. The lack of a large increase in interlayer spacing can also be related to the very high charge density of Al$^{3+}$ cations, which can attract the negatively charged MXene sheets. Previous studies have even suggested the reduction of interlayer spacing of MXenes ($Ti_3C_2T_x$ in this case) upon intercalation of cations with high charge densities in aqueous electrolytes. It is also worth noting that the intercalation of Al$^{3+}$ into layered TiS$_2$ has been reported to slightly decrease the interlayer spacing. Reduced repulsion between sulfur layers in TiS$_2$ structure caused by intercalation of high charge density Al$^{3+}$ cations is cited as the reason for the reduction in interlayer spacing. Li$_3$VO$_4$ is also reported to show only around 0.03 Å increase in its d-spacing upon Al$^{3+}$ intercalation. Similarly, we hypothesize that Al$^{3+}$ intercalation into $V_2CT_x$ structure reduces the repulsion between negatively charged functionalized MXene surfaces, resulting in a very small change in the interlayer spacing after ion intercalation.

Figure 7D:
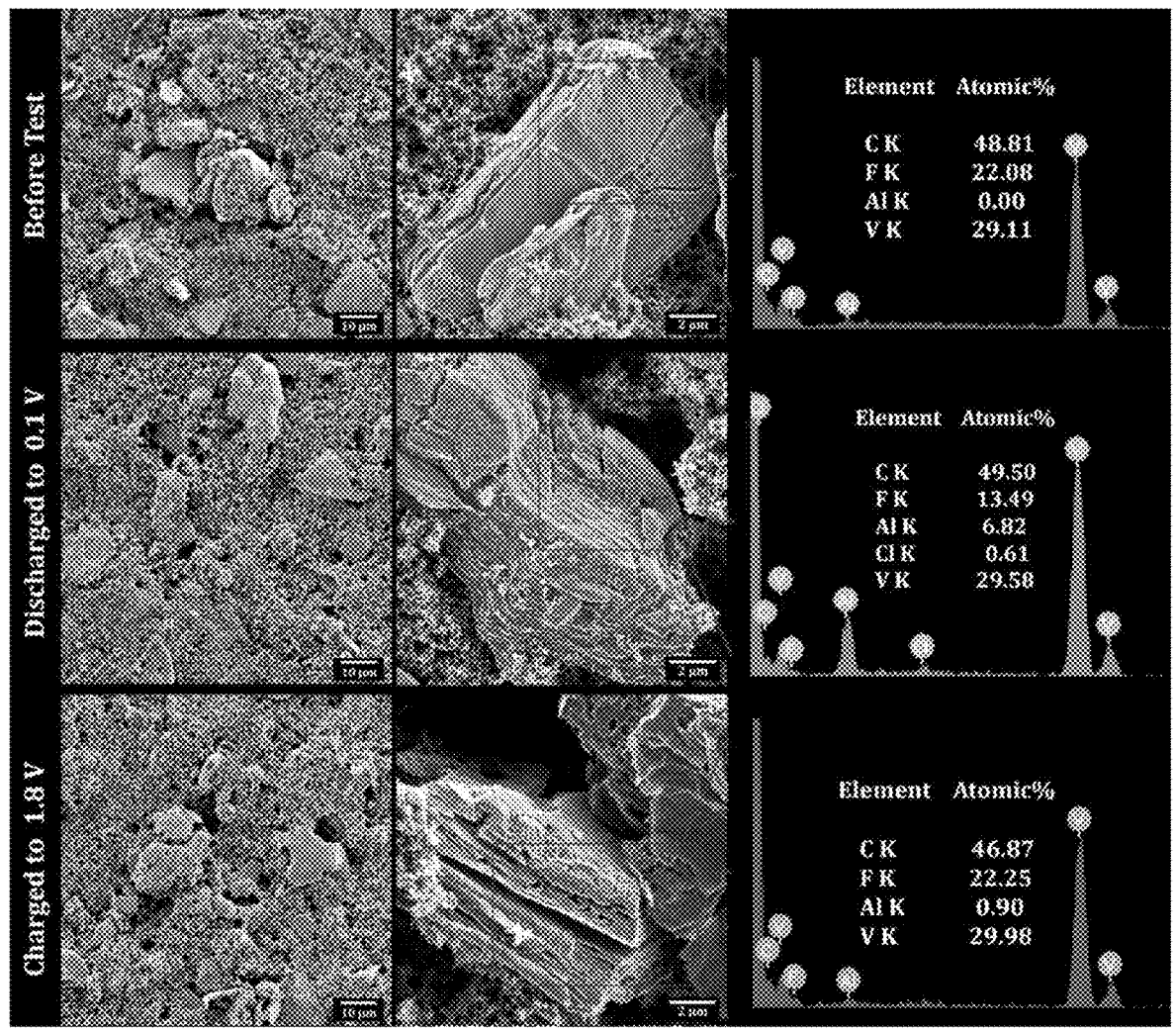
FIG. 7D shows SEM and EDS analysis of multilayered (ML)-$V_2CT_x$ electrodes at different charge states.

Our studies of the composition of the electrodes before and after discharge with energy dispersive spectroscopy (EDS) consistently showed large increases in the Al content and very small increases in the Cl content of the MXenes after discharge. Representative SEM images and the corresponding EDS results of MXene particles before testing, after discharge to 0.1 V (V vs Al/Al$^{3+}$), and after charge to 1.8 V (V vs Al/Al$^{3+}$) are shown in FIG. 7D. Note that the Al content of a typical $V_2CT_x$ MXene particle was measured to be as high as 6.82 atom % upon discharge (FIG. 7D), whereas the Cl content is only 0.61 atom %. EDS results (FIG. 7D) clearly show the increase in the aluminum content of the MXene particles upon discharge and its decrease after charge. On "before test" and "charged" samples, no chlorine was detected on or between the layers of MXene particles. The negligible amount of the chlorine detected in the discharged sample could be due to presence of the residual electrolyte at the surface of MXene or Cl as the result of the dissociation of $[Al_2Cl_7]^-$ anion at the surface of the cathode during the discharge process.

The average Al/V atomic ratio of $V_2CT_x$ MXene electrodes after the second charge and discharge cycles was calculated by performing EDS measurements on 20 different MXenes particles. As shown in Table 2 the Al/V ratio increased from 0.063 to 0.16 upon discharging the electrodes at 50 mA g$^{-1}$, corresponding to an Al content of x=0.22 (V$_2$Al$_{0.22}$CT$_x$). This is in good agreement with the calculated Al content from the electrochemical measurement (x=0.18, considering the presence of F, O, and OH functional groups). Despite the lack of irreversible structural changes or phase transformation, V$_2$CT$_x$ electrodes showed a small but continuous decrease in their specific capacities and Coulombic efficiencies during successive cycles (FIG. 6D). This can be attributed to Al ion trapping in the large MXene particles as EDS also showed a small amount of Al remains in the MXene particles after charging (about 0.9 atom % for the example shown in FIG. 7D). However, the capacity loss and the low Coulombic efficiency of the MXene electrodes can be partly related to the possible side reactions of the electrolyte with remaining water molecules that exist between the V$_2$CT$_x$ layers. It is known that water molecules intercalate between MXene layers during the etching and exfoliation processes, and some interlayer water may remain in MXenes even after drying in a vacuum furnace at 110-140° C.

TABLE 2

Average atomic ratio of aluminum to vanadium in MXene particles/flakes (average of 20 particles per sample) of ML-V$_2$CT$_x$ electrode at different charge states (charging/discharging rate = 50 mA g$^{-1}$).

|  |  | Before Test | Discharged to 0.1 V | Charged to 1.8 V |
|---|---|---|---|---|
| Obtained from EDS | Al/V Ratio | 0.063 | 0.166 | 0.099 |
|  | x Value | 0.11 | 0.33 | 0.19 |
| Experimental Obtained Discharge Capacity |  |  | 90 mAh g$^{-1}$ |  |
| Based on Discharge Capacity | x in V$_2$Al$_x$CF$_2$ |  | 0.175 |  |
|  | x in V$_2$Al$_x$CO$_2$ |  | 0.168 |  |
|  | x in V$_2$Al$_x$C(OH)$_2$ |  | 0.170 |  |

Table 2 shows the average atomic ratio of the aluminum to vanadium at different charge states and the calculated x values in the V$_2$Al$_x$CT (T=F and/or O and (OH)). Considering the measured discharge capacity of 90 mAh g$^{-1}$, the x value was calculated for V$_2$C MXene considering the presence of the three different functional groups with formulas of V$_2$CF$_2$, V$_2$CO$_2$, and V$_2$C(OH)$_2$ for simplicity. The x value in the fully discharged sample increases from 0.11 (for the original sample, due to the presence of some Al in the unreacted MAX particles after etching process) to 0.33. This 0.22 increase in the x value is in good agreement with the calculated values for the three different MXene formulas. The small difference can be due to the presence of the residual electrolyte on the surface of the analyzed electrodes.

Figure 8A:
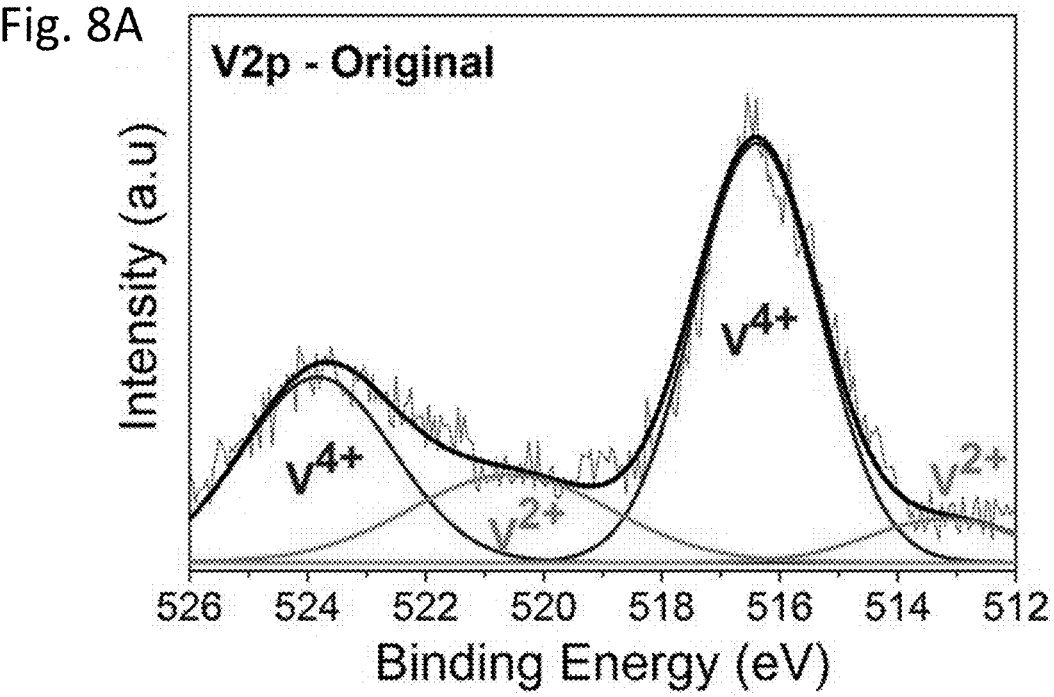
Figure 8D:
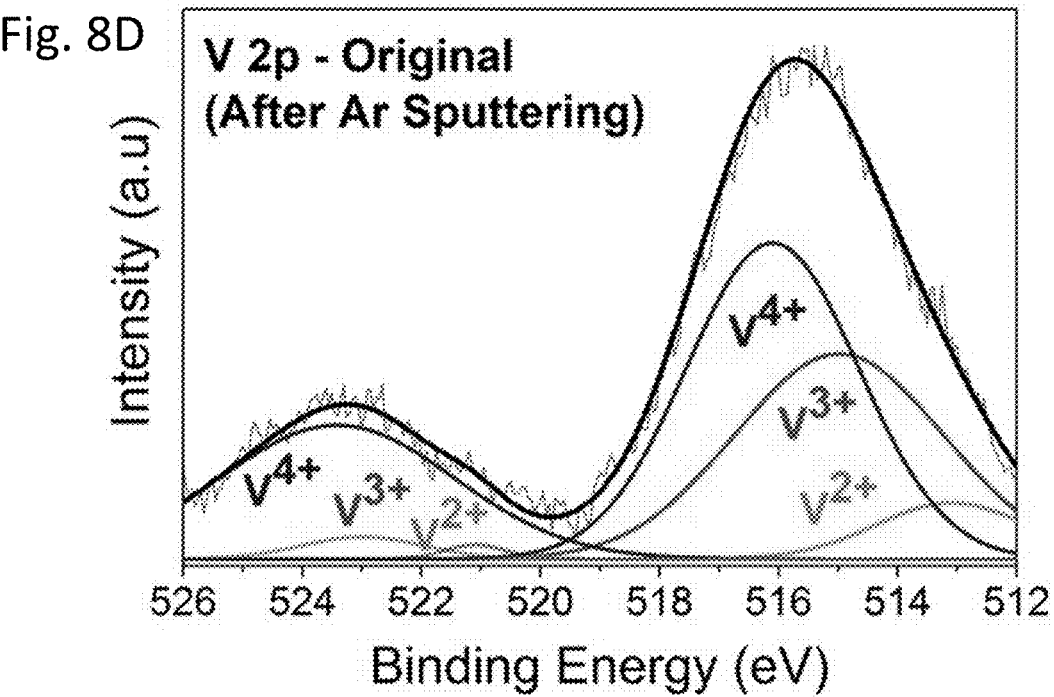
Figure 8B:
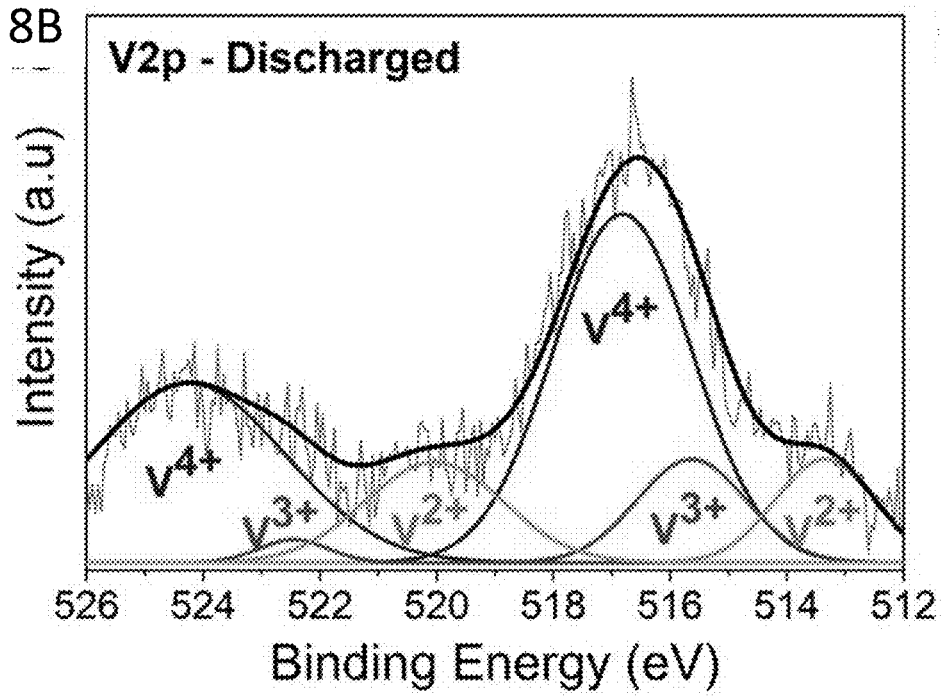
Figure 8E:
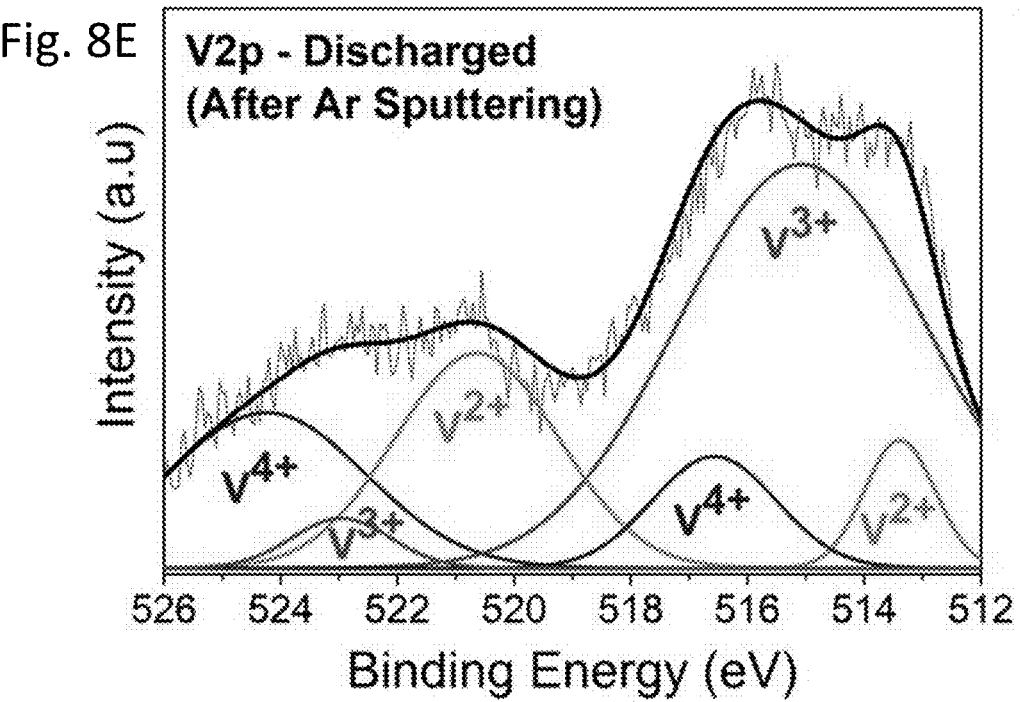

To better understand the charge storage mechanism of V$_2$CT$_x$, X-ray photoelectron spectroscopy (XPS) was carried out on three similar electrodes before testing, after discharging to 0.1 V, and after charging to 1.8 V (both vs Al/Al$^{3+}$; FIGS. 8A-8F). Deconvolution of the V 2p region of the XPS spectra of the electrode before testing (FIG. 8A) mostly showed vanadium in its V$^{4+}$ oxidation state (516.3 eV) due to the presence of a monolayer oxide/vanadium oxide mixture on the surface of vanadium carbide nanosheets. A similar conclusion was suggested by a previous study of the surface chemistry of V$_2$CT$_x$ MXene.[39] The existence of some V$^{2+}$ species was also observed, which can be attributed to the remaining unreacted MAX phase in the pro duced MXenes.[39] For the discharged electrode (FIG. 8B), the V 2p$_{3/2}$ peak develops a shoulder and shows V$^{3+}$ species (515.6 eV) along with V$^{4+}$ (shifted to 516.7 eV), which demonstrates the reduction of vanadium during discharge. After charging to 1.8 V vs Al/Al$^{3+}$ (FIG. 8C), vanadium is mostly present in its V$^{4+}$ oxidation state (516.3 eV) with some V$^{3+}$ remaining in the XPS spectra indicating that charging cannot revert all the V$^{3+}$ to V$^{4+}$. FIGS. 8E-8F show the XPS spectra of discharged and charged samples after Ar sputtering, which can be used to understand the chemical environment inside the V$_2$CT$_x$ cathodes and eliminate the possible effects of residual electrolyte on the electrode surface. After Ar sputtering, some V$^{3+}$ could be detected in the V 2p peak of the original electrode, which is slightly shifted toward lower energies (V$^{4+}$ shifted down to 516.1 eV; FIG. 8D). These XPS spectra show a much higher ratio of V$^{3+}$ to V$^{4+}$ in the discharged samples, indicating the charge storage in V$_2$CT, is based on the change in the oxidation state of the vanadium, similar to the charge storage mechanism observed for V$_2$O$_5$ cathodes used in Al batteries. As shown in FIG. 8E, the major oxidation state of the vanadium in V$_2$CT$_x$ when it is discharged to 0.1 V (vs Al/Al$^{3+}$) is V$^{3+}$, indicating that the electro chemical reaction is not limited to the surface of V$_2$CT$_x$ and exists in the bulk of the material as well (intercalation and diffusion of Al$^{3+}$). The spectra of the charged electrode after Ar etching (FIG. 8F) confirms that some vanadium species with V$^{3+}$ oxidation state remain in V$_2$CT$_x$ after charging. This could be attributed to trapped Al$^{3+}$ ions between MXene layers (meaning not all of the inserted Al$^{3+}$ can reversibly be extracted) or possible surface phase transition as has been reported for V$_2$O$_5$. Further studies are required to completely understand the reason for the irreversible change in the oxidation state of vanadium.

Diffusion of ions into the structure is usually the rate-limiting step for the intercalation of ions in the host materials. The ionic diffusion coefficient (D), diffusion length (l), and diffusion time (T) are related according to T=l$^2$/D. Because D is constant for materials with the same structural parameters, T is proportional with l2, and decreasing the particle size of the host material can decrease intercalation time and increase the rate capability of the battery. The role of particle size on the performance of the electrode is even more pronounced in the case of multivalent-ion batteries due to the generally slower diffusion of multivalent ions in the structure of the host materials. The ML-V$_2$CT$_x$ MXenes studied here have a particle size of about 10-15 μm, which is very large for battery electrode materials. This large particle size may result in a large energy barrier for the diffusion of Al$^{3+}$ ions and reduce the capacity of the electrodes, particularly at high (dis)charge rates. Previous studies on the electrochemical performance of MXenes have shown the improvement of rate capability by delamination of multilayered MXenes into single or few-layer sheets. Therefore, we explored improving the electrochemical performance of cathodes by delamination of V$_2$CT$_x$ MXenes.

Figure 9A:
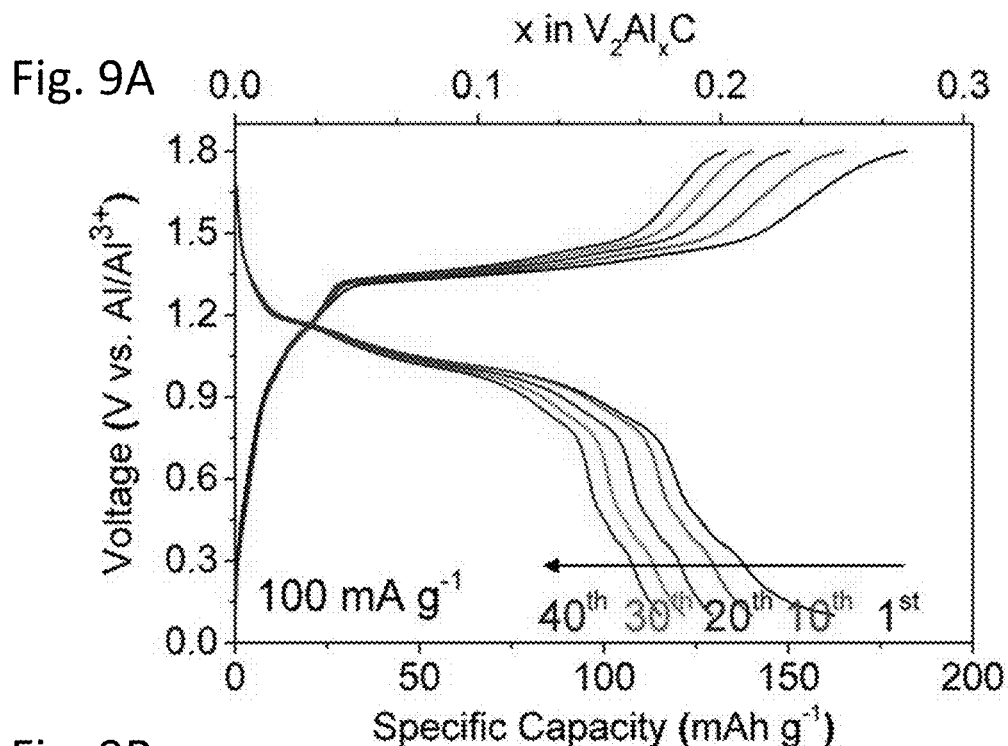
FIG. 9A shows charge-discharge profiles of FL-$V_2CT$ electrodes.

Large organic bases may spontaneously intercalate between MXene layers (including V$_2$CT$_x$). This may lead to a large increase in their interlayer spacing. Examples organic bases capable of spontaneously intercalating include, tetrabutylammonium hydroxide (TBAOH), choline hydroxide, or n-butylamine. The interlayer-expanded MXenes can be delaminated by dispersion in water followed by rigorous hand-shaking. However, they also found that delaminated V$_2$CT$_x$ has a strong susceptibility to oxidation when dispersed in water. To avoid oxidation of MXene during processing and to facilitate the electrode fabrication process, we tried to delaminate MXene in 1-methyl-2-pyrrolidinone (NMP) instead of water. In our first attempt, we simply dispersed ML-$V_2CT_x$ MXenes in NMP by high-speed stirring at moderate temperatures. Interestingly, after 24 h of stirring, a dispersion of delaminated $V_2CT_x$ sheets was formed. Examining the delaminated sheets with atomic force microscopy (AFM) and SEM showed that the delaminated $V_2CT_x$ sheets may have a large distribution in their size and number of layers (ranging from 4 to 5 layers and few hundred nanometer lateral dimensions to tens of individual layers and a few micron lateral dimensions) and single-layer sheets were not observed. Thus, the delaminated MXenes were labeled as few layer (FL) $V_2CT_x$. Next, the dispersion of FL-$V_2CT_x$ in NMP was directly used for the electrode fabrication process by adding conductive additives and binder. As shown in FIG. 9A, FL-$V_2CT_x$ cathode showed a large irreversible initial discharge capacity of 482 mAh g$^{-1}$ and a first cycle discharge capacity of about 162 mAh g$^{-1}$ at a high current density of 100 mA g$^{-1}$ with a Coulombic efficiency of ~88% (note that ML-$V_2$CT showed a discharge capacity of about 90 mAh g$^{-1}$ at the same current density).

Figure 9B:
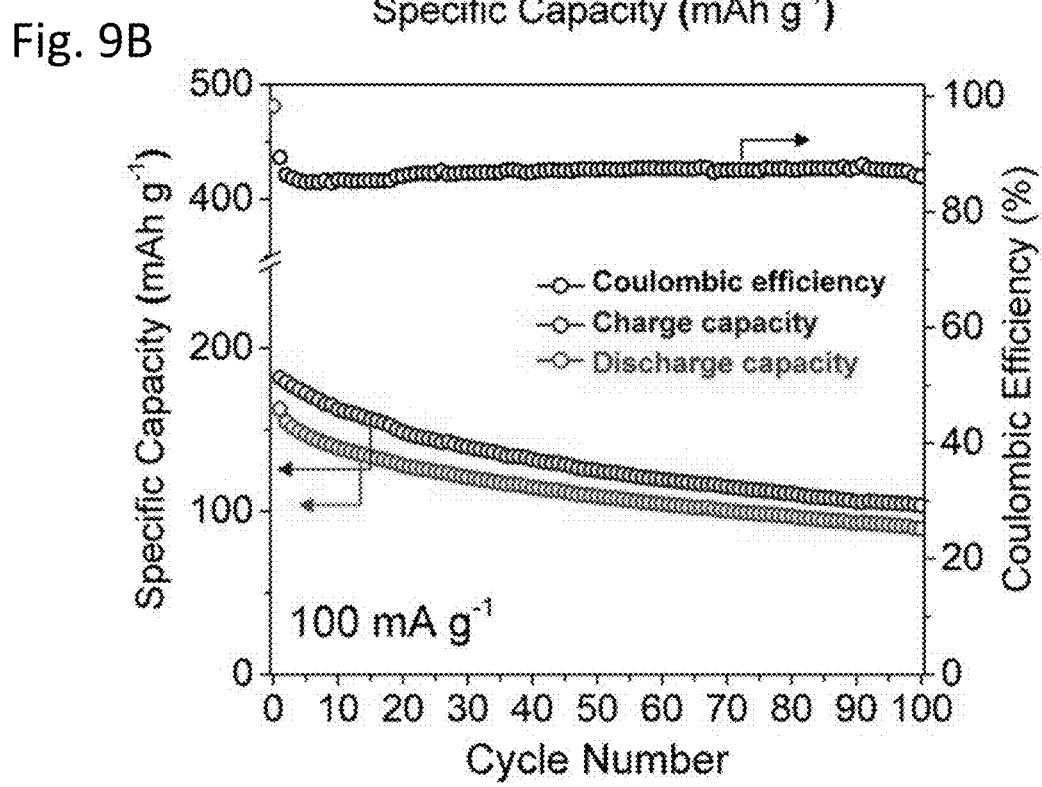
FIG. 9B shows cyclic performance of FL-$V_2CT$ cathode over 100 cycles at a current density of 100 mA $g^{-1}$.
Figure 9C:
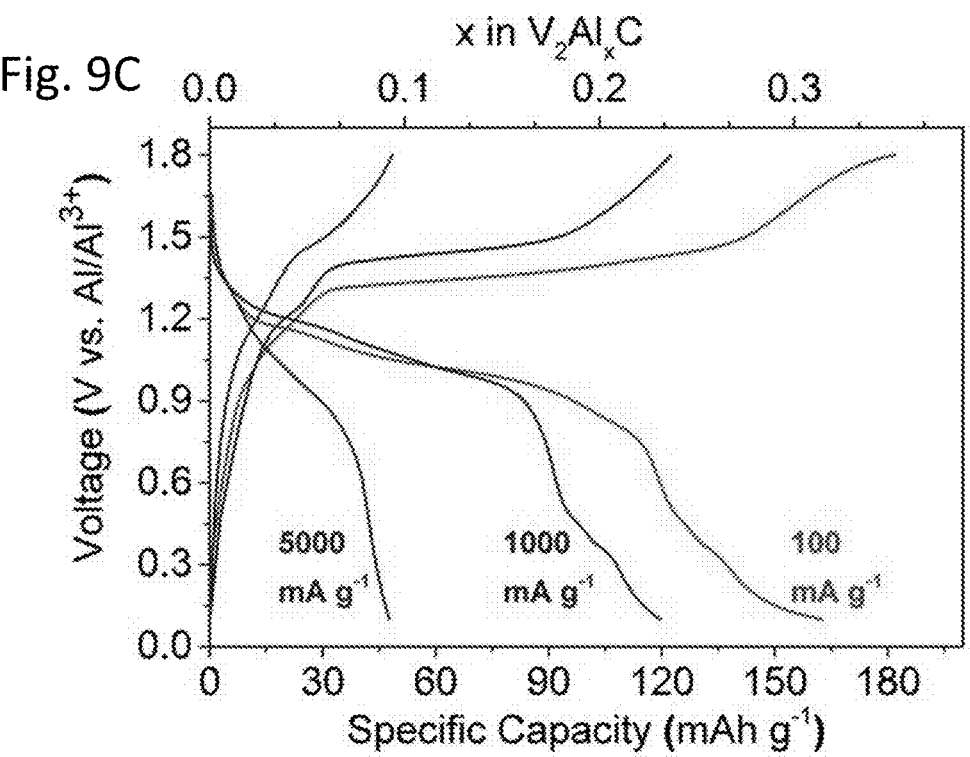
FIG. 9C shows charge-discharge profiles of the FL-$V_2CT$ at different current densities, showing specific capacities as high as 50 mAh $g^{-1}$ at very high rate of 5000 mA $g^{-1}$.
Figure 9D:
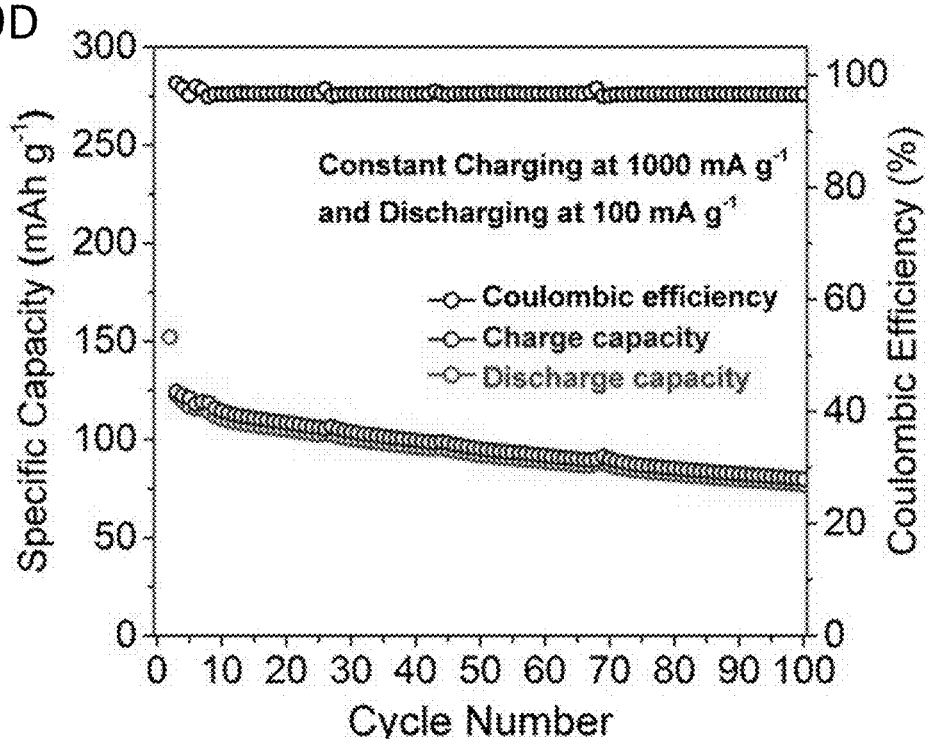
FIG. 9D shows cyclic performance of the FL-$V_2CT_x$ charged at 1000 mA $g^{-1}$ and discharged at 100 mA $g^{-1}$, demonstrating fast-charging capabilities of FL-$V_2CT_x$ electrodes.

However, similar to the ML-$V_2CT_x$ cathodes, the specific capacity of FL-$V_2CT_x$ cathodes declined in the next few cycles but at a comparatively slower rate. The measured capacity of the electrode after 100 cycles was about 90 mAh g$^{-1}$ (FIG. 9B). The voltage profiles of a FL-$V_2CT_x$ electrode (dis)-charged at different current densities (FIG. 9C) indicated the high-rate capability of the electrodes. For example, a specific capacity of ~50 mAh g$^{-1}$ was measured at a very high rate of 5000 mA g$^{-1}$. In addition, our experiments showed that the FL-$V_2CT_x$ cathodes can be charged at considerably high rates (1000 mA g$^{-1}$) and discharged at slower rates (100 mA g$^{-1}$) and still deliver an appreciable discharge capacity of 76 mAh g$^{-1}$ after 100 cycles with a Coulombic efficiency of ~96.6%. This behavior has only been reported for graphite and graphene-based Al batteries thus far.

Figure 10A:
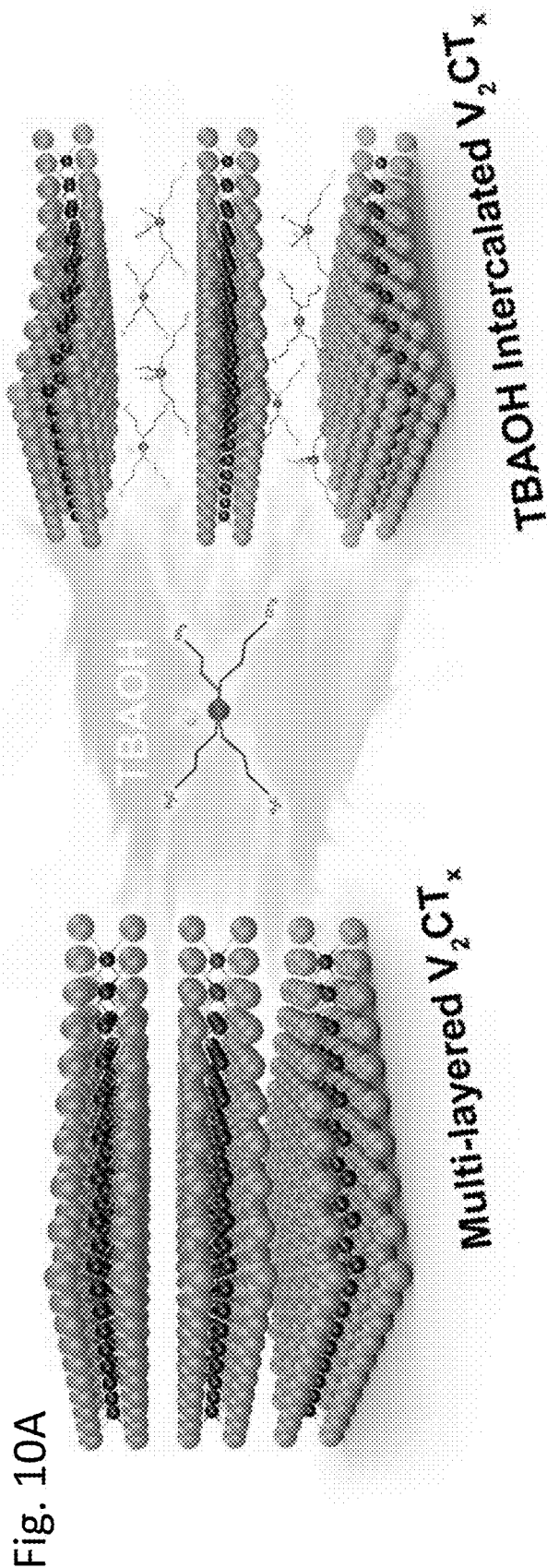
FIG. 10A provides a schematic illustration of interlayer expansion of ML-$V_2CT_x$MXene through TBAOH intercalation.
Figure 10B:
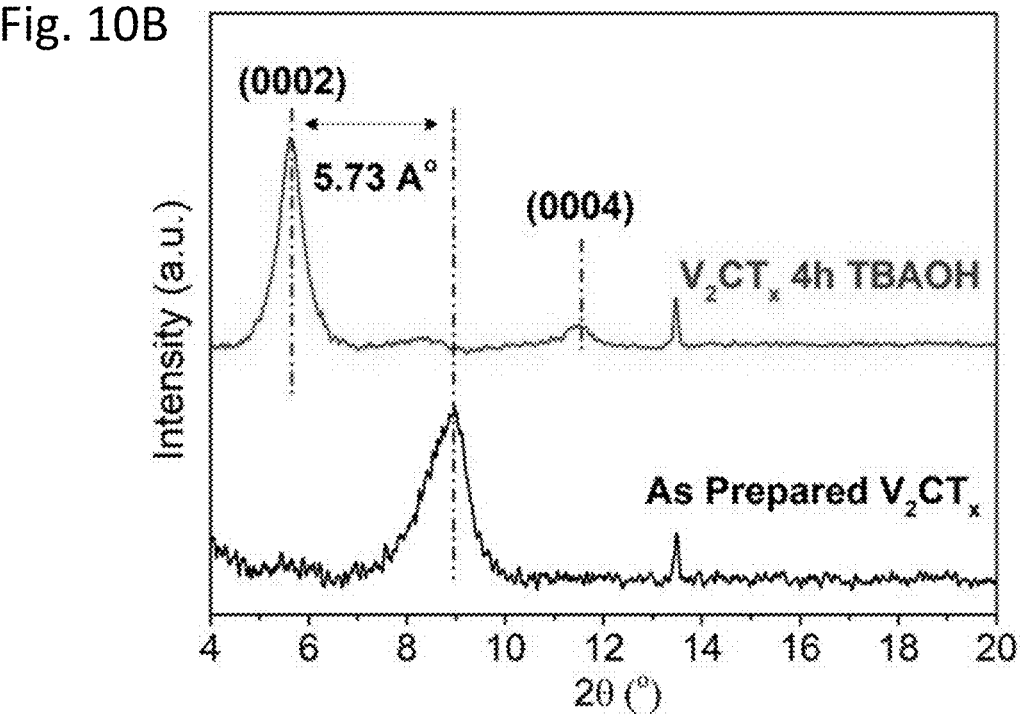
FIG. 10B shows XRD patterns of ML-$V_2CT_x$ and ML-$V_2CT_x$ treated with a TBAOH solution for 4 h at room temperature, showing an increase of about 5.73 Å in the interlayer spacing after TBAOH intercalation.

$V2CT_x$ delamination to improve the electrode performance was explored. First, TBAOH was intercalated between the MXene layers to increase the interlayer spacing of ML-$V_2CT_x$ (FIG. 10A shows a schematic representation of TBAOH intercalation and interlayer expansion of ML-$V_2CT_x$). FIG. 10B shows the XRD pattern of the original ML-$V_2CT_x$ and $V_2CT_x$ treated with TBAOH for 4 h. The peak corresponding to the (0002) plane of MXenes showed a large downshift after TBAOH treatment, corresponding to a 11.46 Å increase in the c-LP. In addition, a new peak corresponding to the (0004) plane of $V_2CT_x$ appeared, which is in good agreement with the XRD results previously reported. After TBAOH intercalation, the interlayer expanded ML-$V_2CT_x$ powder was dried and subsequently delaminated in NMP by high-speed stirring at 60° C. This time a uniform dispersion of delaminated $V_2CT_x$ with only a small amount of nondelaminated particles was achieved.

Figure 10C:
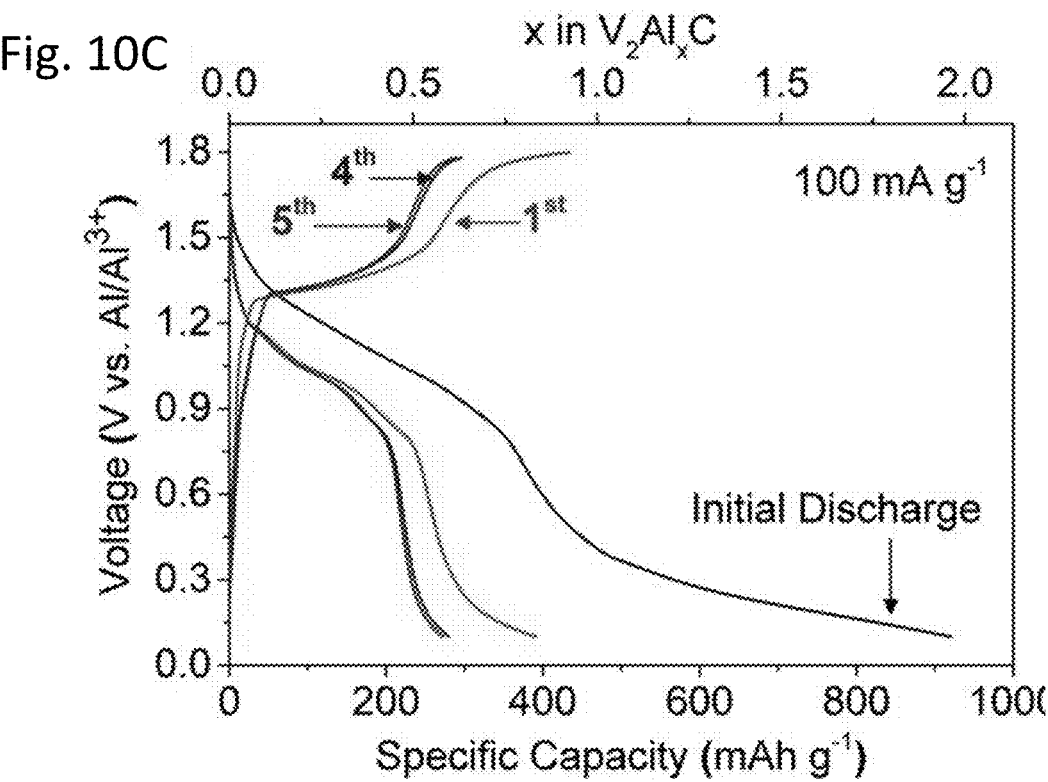
FIG. 10C shows charge-discharge curves of TBAOH-FL-$V_2CT_x$ for the first five cycles.

However, AFM and SEM studies showed that even after TBAOH-assisted delamination the resulting sheets consist of several MXene layers (please see FIGS. 10G-10J and FIGS. 10K-10M, respectively). We studied the electrochemical performance of delaminated MXenes (denoted as TBAOH-FL-$V_2CT_x$) by directly fabricating electrodes from their NMP dispersions and performing electrochemical tests. As shown in FIG. 10C, after a very large initial discharge capacity of 922 mAh g$^{-1}$, the TBAOH-FL-$V_2CT_x$ electrodes showed a very high specific capacity of ~392 mAh g$^{-1}$ at a current density of 100 mA g$^{-1}$ for their first cycle. However, the first cycle shows signs of electrolyte decomposition near the cutoff potentials. After the first cycle, the measured specific capacities for the following four cycles were about 300 mAh g$^{-1}$. To the best of our knowledge, this is the highest specific capacity reported for an intercalation-type cathode material for Al batteries.

Figure 10D:
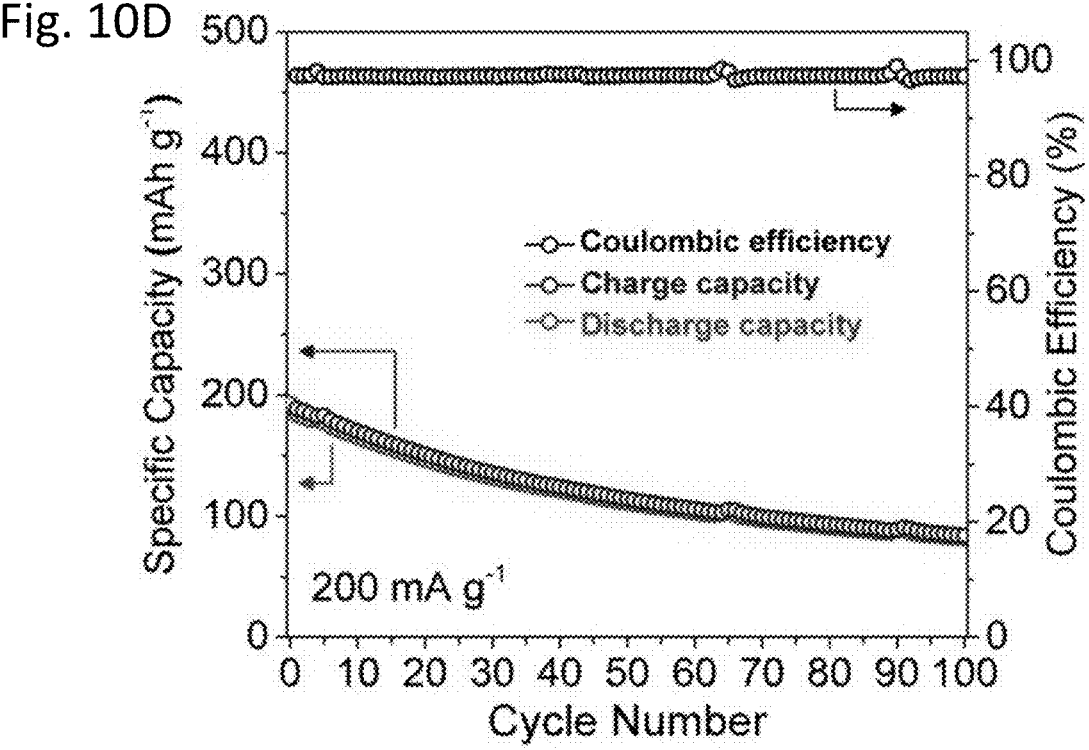
FIG. 10D shows cyclic performance of TBAOH-FL-$V_2CT_x$ cathode over 100 cycles at a current density of 200 mA $g^{-1}$.
Figure 10E:
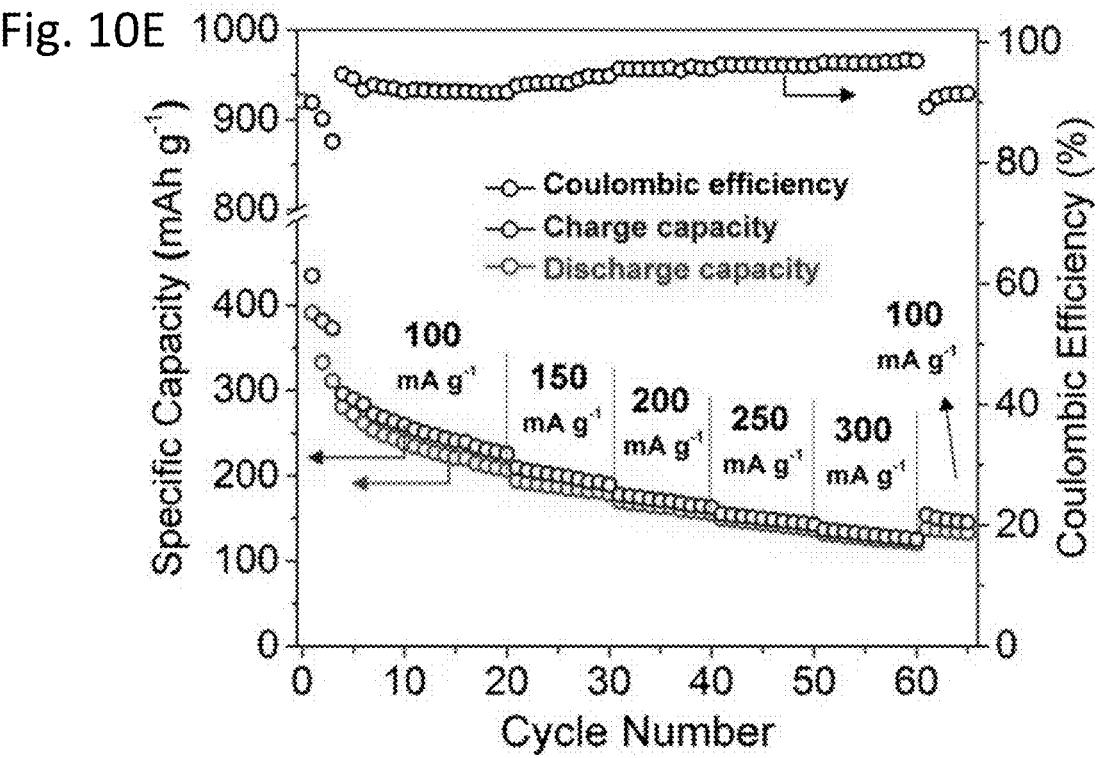
FIG. 10E shows rate capability of a TBAOH-FL-$V_2CT_x$ cathode.
Figure 10F:
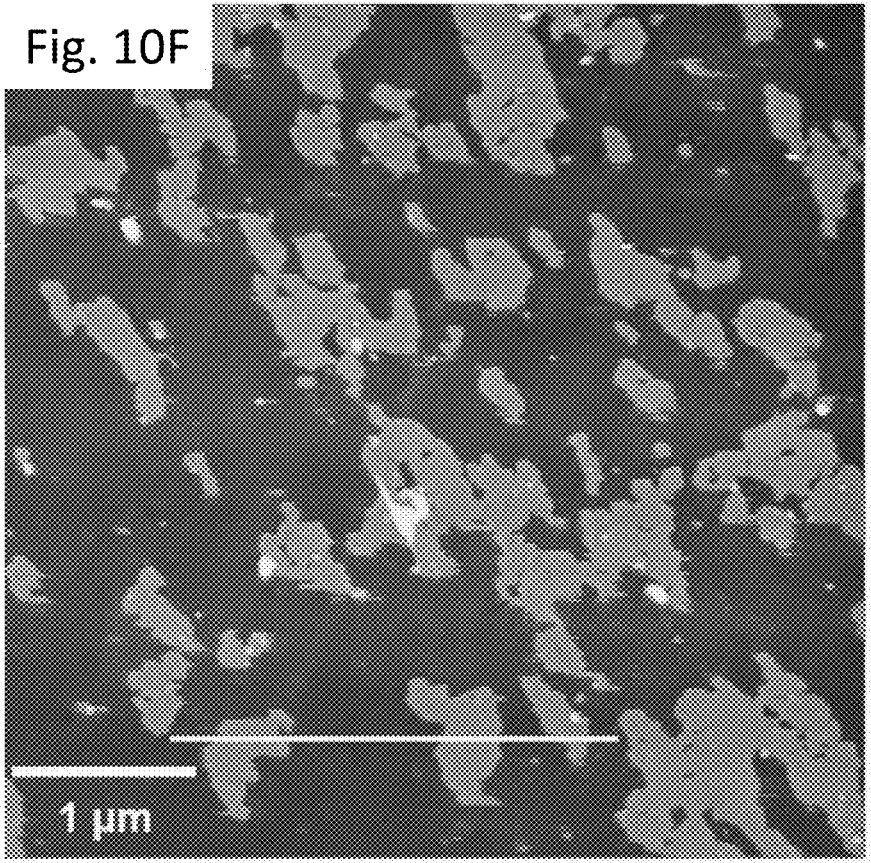
FIGS. 10F-10G show atomic force microscopy (AFM) images of (FIG. 10F) TBAOH-FL-$V_2CT_x$ (delaminated in NMP) and (FIG. 10G) TBAOH-$V_2CT_x$ delaminated in water.
Figure 10H:
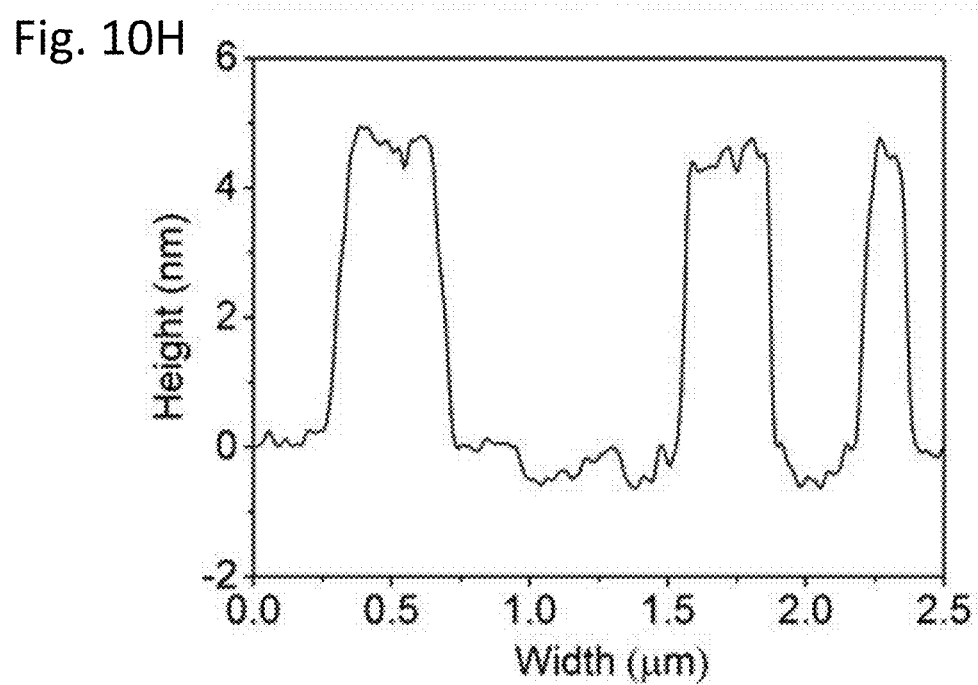
FIGS. 10H-10I shows a height profiles of the trace line in (FIG. 10H) FIG. 10F and (FIG. 10I) FIG. 10G. The $V_2CT_x$ flakes that were first intercalated with TBAOH and then delaminated in NMP are generally bi- or a few layers thick, while direct delamination of $V_2CT_x$ right after TBAOH treatment in water results in single and bi-layer flakes.
Figure 10G:
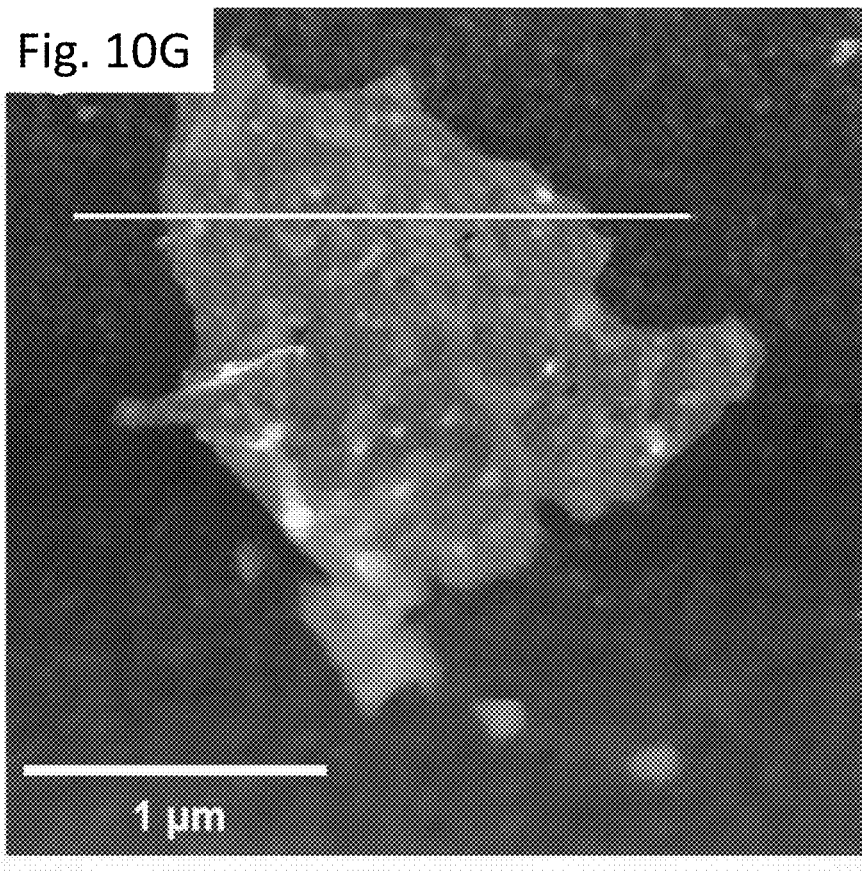
Figure 10I:
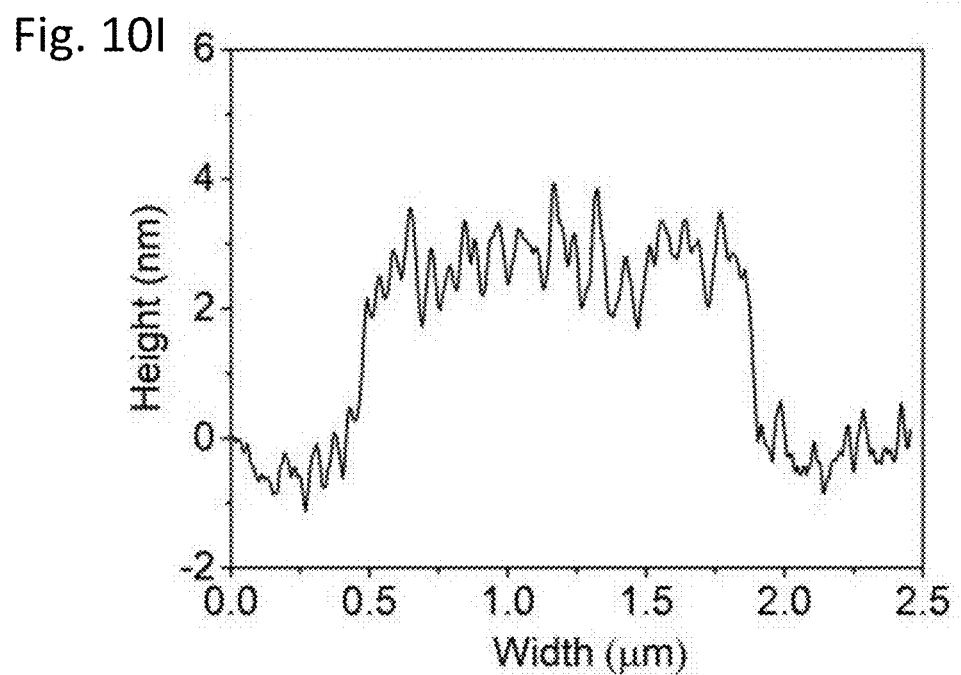
Figure 10M:
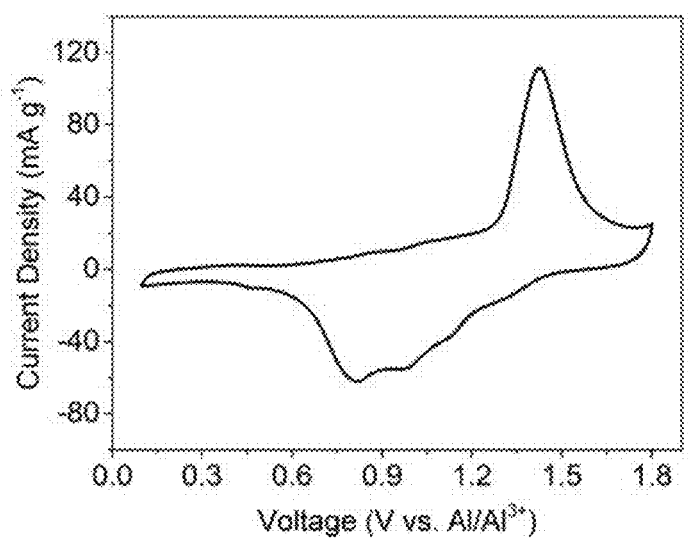
FIGS. 10M-10O shows cyclic voltammograms of (FIG. 10M) ML-$V_2CT_x$, (FIG. 10N) FL-$V_2CT_x$, and (FIG. 10O) TBAOH FL-$V_2CT_x$ at scan rate of 0.1 mV s$^{-1}$ after 50 Cycles.
Figure 10N:
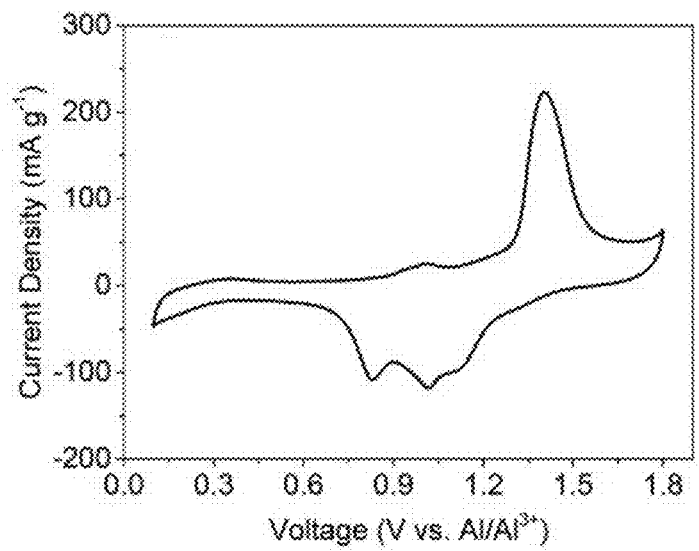
Figure 10O:
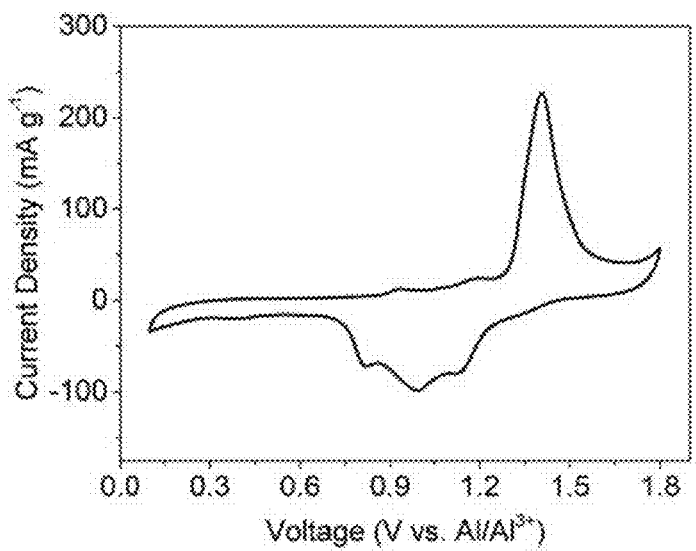
Figure 11:
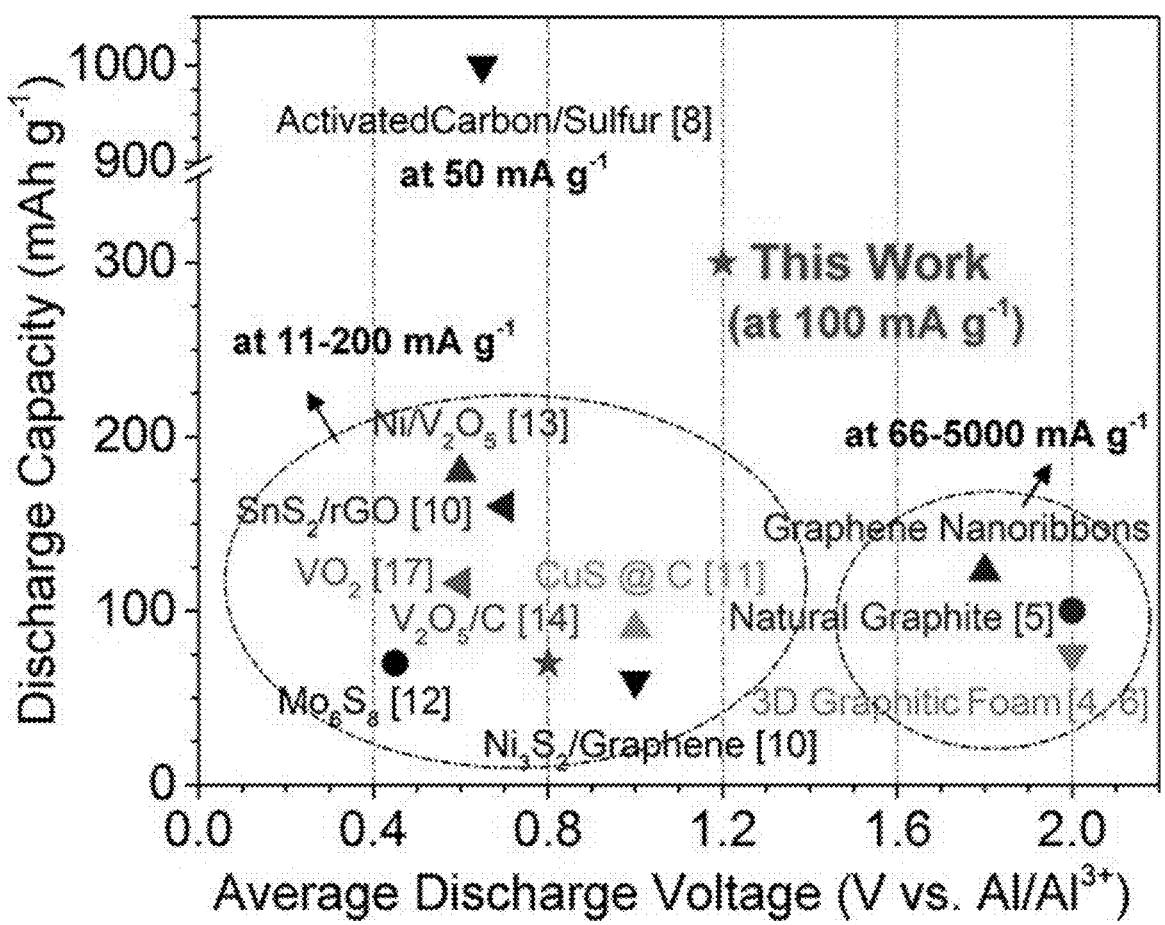
FIG. 11 shows a comparison of the performance of $V_2CT$ MXene cathodes with some of the notable previously reported cathode materials for rechargeable Al batteries. The specific capacity is calculated based on the weight of the active material in the TBAOH-FL-$V_2CT_x$ cathodes.

The cyclic performance tests performed at a high current density of 200 mA g$^{-1}$ (FIG. 10D) showed that the electrodes still suffer from capacity loss during cycling at high charge/(dis)charge rates. It is worth noting that the rate of the capacity loss for the studied $V_2CT_x$MXenes is much lower than most of the previously reported Al-battery cathodes. However, an in-depth understanding of the reasons for the observed capacity decay requires further investigation. Testing the electrodes at various current densities confirmed the excellent rate capability of the TBAOH-FL-$V_2CT_x$ cathodes, which maintained a capacity of about 150 mAh g$^{-1}$ with a Coulombic efficiency of 95% at a high current density of 300 mA g$^{-1}$ (FIG. 10E). As mentioned above, the lower Coulombic efficiency at lower (dis)-charge rates is possibly due to the Al-ion trapping in the electrodes or a slight decomposition of the electrolyte at the surface of the electrode at cutoff potentials. We attribute the improved performance of TBAOH-FL-$V_2CT_x$ compared to FL-$V_2CT_x$ to the higher delamination yield and possibly a more uniform delamination of the former. As shown in FIGS. 10N-10P, CV curves of the FL-$V_2CT_x$ showed bolder cathodic peaks (at around 1.1, 0.95, and 0.8 V) and corresponding anodic peaks (at 0.9, 1.1, and 1.4 V) compared to ML-$V_2CT_x$ or FL-$V_2CT_x$, suggesting the facilitated access of Al$^{3+}$ cations to the intercalation sites between MXene layers. We believe that the performance of the electrodes can be further improved by optimizing the delamination process and controlling the lateral size and number of layers of $V_2$CT, MXenes. Furthermore, controlling the surface chemistry of $V_2CT_x$ might result in an improved electrochemical performance. The combination of the high specific capacity and the relatively high discharge potential of $V_2CT_x$ renders these materials as one the best cathode materials for rechargeable Al batteries reported thus far (FIG. 11).

We have demonstrated that the $V_2CT_x$ MXene is a high-capacity intercalation-type cathode material for rechargeable Al batteries. Based on the presented results, we hypothesize that Al$^3$ cations are the only intercalating species between the layers of MXene; however, further studies are required to completely understand the intercalation mechanism. Also, the intercalation of Al$^{3+}$ cations did not have much effect on the structure of ML-$V_2CT_x$ materials, and only a very small increase in the interlayer spacing of MXene was observed after ion intercalation. We demonstrated that the electrochemical performance of the MXenes can be improved by delamination of ML-$V_2CT_x$ to few-layer sheets. Further improvement of the specific capacity was achieved for MXenes delaminated after preintercalation with TBAOH. This delamination method resulted in a higher delamination yield, and the TBAOH-FL-$V_2CT_x$ cathodes delivered exceptionally high specific capacities of more than 300 mAh g$^{-1}$ at a high (dis)-charging current density of 100 mA g$^{-1}$. However, for all the tested materials, a slow and continuous decline in capacity was observed during cycling. Further studies are required to understand the reasons behind the capacity decay. Nevertheless, the specific capacity, intercalation potential, and cycle life of $V_2CT_x$ MXene electrodes is among the best performances reported so far for intercalation-type Al-battery cathodes. With about 20 MXenes with different compositions and structures synthesized so far and many more theoretically predicted, we speculate that MXenes can be a large family of intercalation-type cathode materials for Al batteries, and we aim to explore other MXene compositions in our future studies.

Materials and Methods

Synthesis of MAX Phases.

To synthesize $V_2AlC$, vanadium powder (99.5%, 325 mesh, Alfa Aesar), aluminum powder (99.5%, 325 mesh, Alfa Aesar), and graphite powder (99%, 325 mesh, Alfa Aesar) were mixed in a 2:1.3:1 ratio and ball milled using zirconia balls for 18 h. Then the mixture was sintered at 1500° C. with a heating rate of 3° C./min for 4 h under flowing argon atmosphere. The synthesized MAX phases were crushed, milled, and sieved through a 400 mesh to obtain powders with an average particle size of ~32 μm.

Synthesis of MXenes.

To synthesize $V_2CT_x$ MXene, $V_2AlC$ MAX phase was treated with 50% concentrated hydrofluoric acid (ACS grade, BDH) for 92 h at room temperature while stirring with a Teflon-coated magnetic bar at 200 rpm. The etched powder was then washed several times using DI water and centrifuging at 4500 rpm for 5 min until the pH of the supernatant was higher than 4. The MXene powder was then filtered using a Celgard porous membrane, rinsed with DI water and absolute ethanol, and collected and dried under vacuum for 24 h. The obtained MXene powder is referred to as multilayered MXenes. The few-layer $V_2CT_x$ (FL-$V_2CT_x$) was produced by dispersion of ML-$V_2CT$ powder in 1-methyl-2-pyrrolidinone (99+%, Alfa Aesar) and stirring at high speeds (1000-1200 rpm) on a hot plate at 60° C. for 24 h. TBAOH intercalation was done by dispersion of the ML-$V_2CT$ powder in a 40% w/w aqueous solution of TBAOH (Alfa Aesar) in a ratio of 1 g to 12.5 mL (MXene powder to TBAOH solution) for 4 h at room temperature. The intercalated powder was then filtered and rinsed with DI water and absolute ethanol several times to remove the residual TBAOH and dried at room temperature under vacuum overnight. To produce the TBAOH-FL-$V_2CT_x$ MXene, the TBAOH-treated powder was stirred (~1000 rpm) in NMP for at least 12 h at 60° C. prior to electrode fabrication.

Preparation of the Ionic Liquid Electrolyte.

The chloroaluminate ionic liquid electrolyte was prepared by mixing 1-ethyl-3-methyl-imidazolium chloride ([EMIm]—Cl, 98+%, Alfa Aesar) and anhydrous high-purity aluminum chloride ($AlCl_3$, 99.999+%, Alfa Aesar) at room temperature in an argon-filled glovebox with oxygen and moisture levels below 0.1 ppm. Prior to mixing, the [EMIm]Cl ionic liquid was completely dried under vacuum at 150° C. for at least 24 h. The high-purity $AlCl_3$ powder was directly used without any purification. To prepare the electrolyte, the $AlCl_3$ was slowly added to the dried [EMIm]Cl ionic liquid in a 1.3:1 molar ratio to avoid excessive heat generation. The resulting yellowish electrolyte was then stirred for 30 min to dissolve the remaining $AlCl_3$ powder. Molecular sieves were used to further decrease the water contents in the electrolyte. To further purify the electrolyte, a piece of polished high-purity aluminum foil was placed in the prepared electrolyte and kept for at least 1 week before using the electrolyte. The final electrolyte used in the experiments was light yellow or colorless.

Cell Fabrication and Electrochemical Measurements.

All electrochemical experiments were carried out in custom-made Te cells or plastic pouch cells to avoid possible reactions of the acidic electrolyte with the stainless-steel coin cells. To prepare the cathodes, the synthesized $V_2CT_x$ MXene powder was mixed with carbon black (Super P, 99+%, Alfa Aesar) and polyvinylidene fluoride (PVDF binder, 99.5%, MTI) in a ratio of 80:10:10 using NMP (99+%, Alfa Aesar) as the solvent and stirring for 24 h to achieve uniform mixture. The resulting slurry was directly casted on a piece of carbon paper (P50, Fuel Cell Earth) and was dried at 120° C. under vacuum for 24 h. The mass loading of the active material was ~0.5-2 mg $cm^{-2}$. High-purity molybdenum foil (99.95%, 3-7 μm thick, Alfa Aesar) or tantalum foil (99.95%, 0.025 mm thick, Alfa Aesar) was used as the current collector for the cathode side, and high-purity aluminum foil (99.9995%, 0.2 mm thick, Alfa Aesar) was used as both the anode and current collector for the anode side of the cells. The aluminum foil electrodes were thoroughly polished and cleaned with absolute ethanol (anhydrous) before use. Two layers of Celgard microporous membranes (3501) were used as separators, and the prepared $AlCl_3$/[EMIm]Cl ionic liquid with a molar ratio of 1.3:1 was used as the electrolyte in the cell. The cell components were completely dried under vacuum overnight prior to cell fabrication, and the cell fabrication process was carried out in an argon-filled glovebox.

Cyclic Voltammetry and Galvanic Charge-Discharge Experiments.

Cyclic voltammetry and galvanic charge-discharge experiments were carried out using BioLogic VMP3 potentiostat. The aluminum batteries were tested in a 1.7 V voltage window (0.1-1.8 V vs $Al/Al^{3+}$). The carbon paper used as the cathode substrate was inactive in this potential window. This was demonstrated by performing CV and charge/discharge experiments on a cell using bare carbon paper as the cathode at a scan rate of 1 mV/s and applied current density of 5 mA $g^{-1}$ in the same 1.7 V potential window (please see FIG. 12). All galvanostatic charge-discharge experiments were carried out between 0.1 and 1.8 V (V vs $Al/Al^{3+}$) at different current densities (based on the total mass of the active material (MXene) in the electrode).

Characterization Techniques.

The structure and morphology of the synthesized MAX and MXene powders and electrodes were characterized using Bruker X-ray diffractometer with 40 kV and 40 mA Cu Kα radiation in 0.40 2θ steps and JEOL JSM-7000F scanning electron microscope equipped with an energy-dispersive spectrometer (EDS detector). For TEM sample preparation, a dual beam focused ion beam (FEI Helios Nanolab 460F1) was used to prepare the lamellae from $V_2CT_x$ electrodes at different charge states. After thinning, the lamellae were imaged using a Talos F200x transmission electron microscope equipped with a super-X SDD EDXS at 200 kV. HRTEM/STEM imaging modes were used to study the morphology and the structure of the samples. EDS mapping was used to confirm the presence of different elements. To investigate the structural and morphological changes of the electrodes after cycling, the battery cells were opened in a glovebox after six successive charge and discharge cycles at current density of 50 mA $g^{-1}$. The fully charged (to 1.8 V) and discharged (0.1 V) electrodes were thoroughly washed with anhydrous ethanol and dried in the glovebox for at least 12 h before further analysis. For XRD and SEM analysis, the washed and dried electrodes were quickly transferred out of the glovebox and were analyzed. For XPS analysis, the samples were completely sealed in plastic bags inside the glovebox to avoid any reaction with air and then were transferred out of glovebox, and XPS analysis was performed as soon as samples were received. Photoemission measurements were performed in a Kratos AXIS 165 surface analysis system equipped with a 165 mm hemispherical analyzer (HAS). XPS spectra were recorded in the fixed analyzer transmission mode using a monochromatic aluminum source at 12 mA and 15 kV. The step size was set to 0.05 eV with 500 ms dwell time (700 for V) and two sweeps across each energy range. The chamber was purged with nitrogen. For argon etching of the surface of the samples, Ar sputtering was done for 10 min at 4 kV, with a large spot size (~2 mm$^2$). The resolution of the instrument at the operating parameters was measured from fwhm of the Ag 3d$_{5/2}$ peak to be 1.0 eV. The XPS energy scale was calibrated by setting the Ag 3d$_{5/2}$ line on clean silver to exactly 368.3 eV referenced to the Fermi level. The angle of the incidence of the X-ray beam relative to the specimen normal was 54.70.

All analyses were performed on the original electrode, fully discharged (0.1 V), and fully charged (1.8 V) electrodes.

We claim:

1. A method of preparing an MXene composition comprising providing an electrochemical cell and applying a potential to the electrochemical cell for an effective amount of time to electrochemically etch a MAX phase composition to remove substantially all of an A-group element,
    wherein the electrochemical cell comprises:
        (a) an electrode comprising a layered material having a plurality of layers, each of the layers comprising a substantially two-dimensional ordered array of cells, wherein the layered material comprises the MAX phase composition having an empirical formula of $M_{n+1}AX_n$,
            wherein A comprises the A-group element and the A-group element is selected from the group consisting of Al, Si, P, S, Ga, Ge, As, Cd, In, Sn, Tl, Pb, and any combination thereof,
            wherein M comprises a transition metal selected from the group consisting of a Group IIIB metal, a Group IVB metal, a Group VB metal, a Group VIB metal, and any combination thereof;
            wherein X is $C_xN_y$, wherein x+y=n; and
            wherein n is equal to 1, 2, or 3; and
        (b) an electrolyte,
        wherein the electrode is a working electrode and the electrochemical cell further comprises a counter electrode and/or a reference electrode.

2. The method of claim 1, wherein the A-group element comprises Al.

3. The method of claim 1, wherein the electrolyte comprises a room-temperature ionic liquid or a deep eutectic solvent.

4. The method of claim 1, wherein the potential is an anodic potential.

5. The method of claim 1, wherein electrochemically etching the MAX phase composition comprises applying the potential to the electrochemical cell for an effective amount of time to prepare a MXene composition have an empirical formula of $M_{n+1}A_yX_n$,
    wherein y is less than 0.5.

6. The method of claim 5, wherein y is less than 0.2.

7. The method of claim 5, wherein the potential is an anodic potential.

8. The method of claim 2, wherein the MAX phase composition comprises a composition having an empirical formula selected from the group consisting of Ti$_2$AlC, V$_2$AlC, Cr$_2$AlC, Nb$_2$AlC, Ta$_2$AlC, Ti$_3$AlC$_2$, V$_3$AlC$_2$, Ta$_3$AlC$_2$, Ti$_4$AlC$_3$, V$_4$AlC$_3$, Nb$_4$AlC$_3$, Ta$_4$AlC$_3$, Mo$_2$TiAlC$_2$, Cr$_2$TiAlC$_2$, Mo$_2$Ti$_2$AlC$_3$, and any combination thereof.

9. The method of claim 8, wherein the method prepares an MXene composition having an empirical formula selected from the group consisting of Ti$_2$Al$_y$C, V$_2$Al$_y$C, Cr$_2$Al$_y$C, Nb$_2$Al$_y$C, Ta$_2$Al$_y$C, Ti$_3$Al$_y$C2, V$_3$Al$_y$C2, Ta$_3$Al$_y$C$_2$, Ti$_4$Al$_y$C$_3$, 5 V$_4$Al$_y$C$_3$, Nb$_4$Al$_y$C$_3$, Ta$_4$Al$_y$C$_3$, Mo$_2$TiAl$_y$C$_2$, Cr$_2$TiAl$_y$C$_2$, Mo$_2$Ti$_2$AlyC$_3$, and any combination thereof.

10. The method of claim 3, wherein the electrolyte comprises [AlX$_4$]$^-$, [Al$_2$X$_7$]$^-$, or any combination thereof and each X is independently selected from Cl or Br.

11. The method of claim 10, wherein X is Cl.

12. The method of claims 10, wherein the electrolyte further comprises a cation comprising a member of the group consisting of a imidazolium cation, a pyridinium cation, an ammonium cation, a piperidinium cation, a pyrrolidinium cation, an alkali cation, an any combination thereof or wherein the electrolyte further comprises a polar molecule selected from the group consisting of urea, dimethylsulfone, an amide, a glyme, or a combination thereof.

13. The method of claim 3, wherein the electrolyte comprises the room-temperature ionic liquid.

14. The method of claim 13, wherein the electrolyte comprises [AlX$_4$]$^-$, [Al$_2$X$_7$]$^-$, or any combination thereof and each X is independently selected from Cl or Br.

15. The method of claim 14, wherein the electrolyte further comprises a cation comprising a member of the group consisting of a imidazolium cation, a pyridinium cation, an ammonium cation, a piperidinium cation, a pyrrolidinium cation, an alkali cation, and any combination thereof.

16. The method of claim 3, wherein the electrolyte comprises the deep eutectic solvent.

17. The method of claim 16, wherein the electrolyte comprises [AlX$_4$]$^-$, [Al$_2$X$_7$]$^-$, or any combination thereof and each X is independently selected from Cl or Br.

18. The method of claims 17, wherein the electrolyte further comprises a polar molecule selected from the group consisting of urea, dimethylsulfone, an amide, a glyme, or a combination thereof.

* * * * *